(12) United States Patent
Nikolla

(10) Patent No.: US 11,470,923 B1
(45) Date of Patent: Oct. 18, 2022

(54) MAGNETIC CONNECTOR FOR SELECTIVELY JOINING A LEASH TO AN ANIMAL COLLAR

(71) Applicant: Gjergj Nikolla, Brooklyn, NY (US)

(72) Inventor: Gjergj Nikolla, Brooklyn, NY (US)

( * ) Notice: Subject to any disclaimer, the term of this patent is extended or adjusted under 35 U.S.C. 154(b) by 582 days.

(21) Appl. No.: 15/679,129

(22) Filed: Aug. 16, 2017

Related U.S. Application Data

(60) Provisional application No. 62/375,848, filed on Aug. 16, 2016.

(51) Int. Cl.
  *A44B 99/00* (2010.01)
  *A01K 27/00* (2006.01)

(52) U.S. Cl.
  CPC .......... *A44B 99/005* (2013.01); *A01K 27/005* (2013.01); *A44D 2203/00* (2013.01)

(58) Field of Classification Search
  CPC .. A44B 99/005; A01K 27/001; A01K 27/003; A01K 27/005; A44D 2203/00; Y10T 24/32; Y10T 292/11
  USPC ............................ 119/772, 792, 863; 24/303
  See application file for complete search history.

(56) References Cited

U.S. PATENT DOCUMENTS

| | | | | |
|---|---|---|---|---|
| 3,086,268 A * | 4/1963 | Chaffin, Jr. | ............. | A41F 1/002 24/303 |
| 4,541,364 A * | 9/1985 | Contello | .............. | A01K 27/005 119/772 |
| 4,932,362 A * | 6/1990 | Birchmire, III | ..... | A01K 27/005 119/772 |
| 6,230,663 B1 * | 5/2001 | Welch | .................. | A01K 27/005 119/772 |
| 7,389,750 B1 * | 6/2008 | Rogers | ................. | A01K 27/005 119/792 |
| 9,179,647 B2 * | 11/2015 | Lambert | .............. | A01K 27/001 |
| 2002/0035968 A1 * | 3/2002 | Prusia | .................. | A01K 27/003 119/792 |
| 2003/0145801 A1 * | 8/2003 | DeBien | ................ | A01K 27/005 119/772 |
| 2011/0214260 A1 * | 9/2011 | Wang | .................... | A44C 5/2076 24/303 |
| 2012/0131967 A1 * | 5/2012 | Sanchez Giraldez | ... | E05B 67/36 70/276 |
| 2013/0185901 A1 * | 7/2013 | Heyman | .............. | A01K 27/005 24/303 |

(Continued)

*Primary Examiner* — Brady W Frazier
(74) *Attorney, Agent, or Firm* — Troy & Schwartz, LLC; Susan Dierenfeld-Troy

(57) ABSTRACT

A magnetic connector providing a unique magnetic coupling system for quick, one-handed attachment and detachment of a leash to a pet collar or harness is disclosed. The magnetic connector has a cap with an outer armature for leash attachment and an inner female receptacle element for receiving a male insertion element previously attached to a collar. The male insertion element is in the shape of a star polygon having multiple attached magnets. The female receptacle element has a complementary aperture shape for insertion of the star polygon. The cap includes multiple attached magnets of opposite polarity to the star polygon's attached magnets. Upon insertion of the cap onto the star polygon, the cap undergoes rotation caused by the attractive magnetic forces between the star polygon's and the cap's magnets, locking the cap in place until the cap is manually rotated in the opposite direction and lifted off the star polygon.

11 Claims, 22 Drawing Sheets

(56) References Cited

U.S. PATENT DOCUMENTS

2014/0250639 A1* 9/2014 Siwak .................. A01K 27/005
                                                    24/303
2016/0000189 A1* 1/2016 Bolen ..................... A44B 1/30
                                                    24/303

* cited by examiner

MAGNETIC CONNECTOR FOR SELECTIVELY JOINING A LEASH TO AN ANIMAL COLLAR

UTILITY PATENT APPLICATION

This application claims priority to provisional patent application Ser. No. 15/679,129 filed on Aug. 16, 2017.

BACKGROUND OF THE INVENTION

The present invention relates to a magnetic connector for easily connecting and disconnecting a leash to and from a animal collar ("collar"). The person attempting to secure a leash to collar must generally use both hands to effectively secure the leash to the collar where one hand is used to hold the collar's loop, often a metal D ring, in a fixed position while using the other hand to secure the leash's hooking means, often a lobster type of hook, onto the collar's loop. Such a two-handed step can be particularly difficult when the pet is unusually lively, the pet leash securer has a disability or is suffering from the common ailments of advanced age such as arthritis.

Additionally, those individuals who have long finger nails may be unable to easily hook/unhook a leash to and from a animal collar without experiencing nail splitting or chipping.

The present invention addresses these common problems by providing a magnetic fastener device providing for the one-handed securing of a leash to a collar. The device is particularly adapted for use with a collar having a buckle or plastic snap ("quick-release") closure.

Various types of magnetic connectors with specific application to animal collars and pet leashes are known in the prior art. U.S. Pat. No. 3,086,268 to Chaffin discloses a connector for securing the adjacent free ends of a animal collar to each other and/or a chain to a animal collar. Chaffin's device includes a steel armature, a pole cap, a permanent magnet with oppositely facing pole faces of opposite polarity, a flat pole disk. Each pole face is formed with a small central socket which surrounds a central opening extending axially through the magnet. Upon assembly, the pole cup is first screwed into the armature. Upon insertion into the pole cap, the magnet's top pole face is magnetically attracted to the bottom wall of the device's pole cup thereby causing the magnet to become "seated" within the pole cup. A flat, disk-like pole piece fits flatly against the bottom pole face of the inserted magnet. A rivet passing through the central opening serves to keep the device permanently assembled. The device includes two small eyelets for either connecting the bail of a animal collar to a chain or for securing the two free ends of a animal collar.

The usage of Chaffin's device as a connector of the two free ends of a animal collar provides a collar that lacks the desirable quick release plastic snap mechanism of today's animal collars. Also, the usage of the device to attach a chain to a pet's collar results in an additional piece of hardware hanging from the animal collar. The disclosure also indicates that the removal of the chain, for example, requires actual disassembling of the device.

U.S. Pat. No. 9,179,647 to Lambert is for collar wherein the free ends have magnetic elements on the collar's two opposite ends for securing the free ends of the collar together as the result of attractive forces between the two oppositely positioned magnetic elements. The device includes an eyelet mounted on each of the opposite ends of the collar. When the opposite ends of the collar are placed side-by-side, the attractive forces between the two magnetic elements cause the ends of the collar to become reversibly adjoined and the eyelets parallel. The user may then attach a leash dip to the collar via the two eyelets. The neck strap is configured to separate when light force is exerted on the neck strap to overcome the attractive magnetic forces of the two oppositely positioned magnetic elements. The device most likely requires the usage of two hands to ensure that the leash clip is attached to both eyelets. Unintended attachment to only one eyelet may well cause unintended separation of the aligned magnetic elements due to the uneven exertion of force on the "closest" magnet.

U.S. Pat. No. 7,389,750 to Rogers, et al. for a quick connect tether connecting system which, as it intended for use with a pet leash and animal collar, includes a receptacle with a magnet on the animal collar for receiving an internal plunger element affixed on a pet leash wherein upon insertion into the receptacle, the male section is magnetically attracted and reversibly secured within the receptacle. The device is configured so that the exertion of light force on the leash causes the leash to separate from the collar. Although it may involve a one-handed operation, the device requires the modification of both a pet leash and a animal collar to practice the invention.

The foregoing prior art does not solve the specific problem solved by the present invention: how to quickly and simply secure a pet leash to a animal collar via an aesthetically pleasing device requiring a one-handed operation where only simple modification of the animal collar is required to use the device. Additionally, the disclosed device can be used with any type of animal collar including the desirable "quick-release" collars and allows the user to use one hand when attaching/detaching the leash to and from a animal collar. The strategic positioning of a plurality of magnets within the device also overcomes the potential problem of leash disengagement from the pet's collar.

As will become obvious below, the disclosed magnetic connector has many applications besides its usage as a device to connect a pet leash to a animal collar.

SUMMARY OF THE INVENTION

The invention in an exemplary embodiment comprises threaded armature element, a threaded female receptacle element and a male insertion element. The armature has a top surface with an affixed loop such as a D ring for reversibly receiving the hook of a pet leash, generally a lobster type hook, or other item the device user wishes to attach to the affixed ring. The armature element is substantially circular in shape. A substantially centrally located magnet is affixed to the inside surface of the armature.

The threaded female receptacle element is substantially cylindrical in shape and comprises a first aperture contained within its bottom side in the shape of a regular star polygon with five vertices, five points, and ten lateral sides and an interior extending from, substantially near the top side to near the bottom side of the threaded female receptacle element. The cavity comprises five substantially rectangular holding chambers with each arm comprising a back wall, two opposite lateral sides, and a floor. The floor includes a substantially triangular-shaped opening and an adjacent solid resting platform. At least one magnet is affixed to the lateral side adjacent to the resting platform of each of the five holding chambers, providing a holding chamber with a total of at least five magnets. The Invention's cap comprises the threaded armature element threaded onto the threaded female receptacle element wherein the cap's bottom side comprises the bottom side of the threaded female receptacle element.

The male insertion element is substantially in the shape of a regular star polygon with dimensions selected to allow it to be readily inserted without tilting through the outer star-shaped aperture of threaded female receptacle element and into the threaded female receptacle element's cavity. One side wall of each triangular projection includes at least one magnet having an opposite polarity to the magnets of the holding chambers. At least one magnet of opposite polarity to the magnet affixed to the inner side of the top side of the armature is affixed to the outer side of the top surface of the male insertion element. The bottom side of male insertion element includes a centrally located protruding member having a threaded socket for attachment to a animal collar or other support with a complementary threaded screw. To use the device, the male insertion element is first securely affixed to the selected tether receiver such as a animal collar where it is intended to remain. A magnet of opposite polarity to the magnet affixed to the inner side of the top side of the threaded armature element is affixed to the outer side of the top surface of the male insertion element.

To connect a leash to e.g., a animal collar using the device, the device's cap comprising the assembled threaded armature and threaded female receptacle element is positioned above the male insertion element previously affixed to the collar, such that each triangular opening of the cap's star-shaped outer aperture is aligned with one of the triangular projections of the male insertion element. Gentle pushing of the aligned cap onto the male insertion element causes each triangular projection to become nested within one of the triangular openings 133 comprising the five holding chambers 111 of the female receptacle element. As the result of attractive magnetic forces between magnets of opposite polarity, the cap rotate in a clockwise direction to provide locking of the cap onto the male insertion element. In the locked position, the male element's triangular projections are no longer aligned with the triangular openings of the holding chamber because these latter openings have also rotated as a result of the cap's rotation.

To remove the pet leash from the animal collar, the cap is turned in a counterclockwise direction. The turning motion provides the light force necessary for overcoming the magnetic attractive forces and causing the male insertion element to again be aligned with the triangular opening of its respective holding chamber. The cap is then separated from the male insertion element by pulling upwardly to separate the cap from the male insertion element. The leash may then be removed from the cap's hook if desired or the leash may remain hooked onto the cap if desired until the leash is again to be secured to the pet's collar.

As is discussed below, the invention utilizes the same mechanism of operation for all of its embodiments through its dual magnet system and holding chamber structure applicable to all embodiments to achieve its many benefits from ease of use, to tight, secure connections.

DETAILED DESCRIPTION OF THE INVENTION

Figure 1:
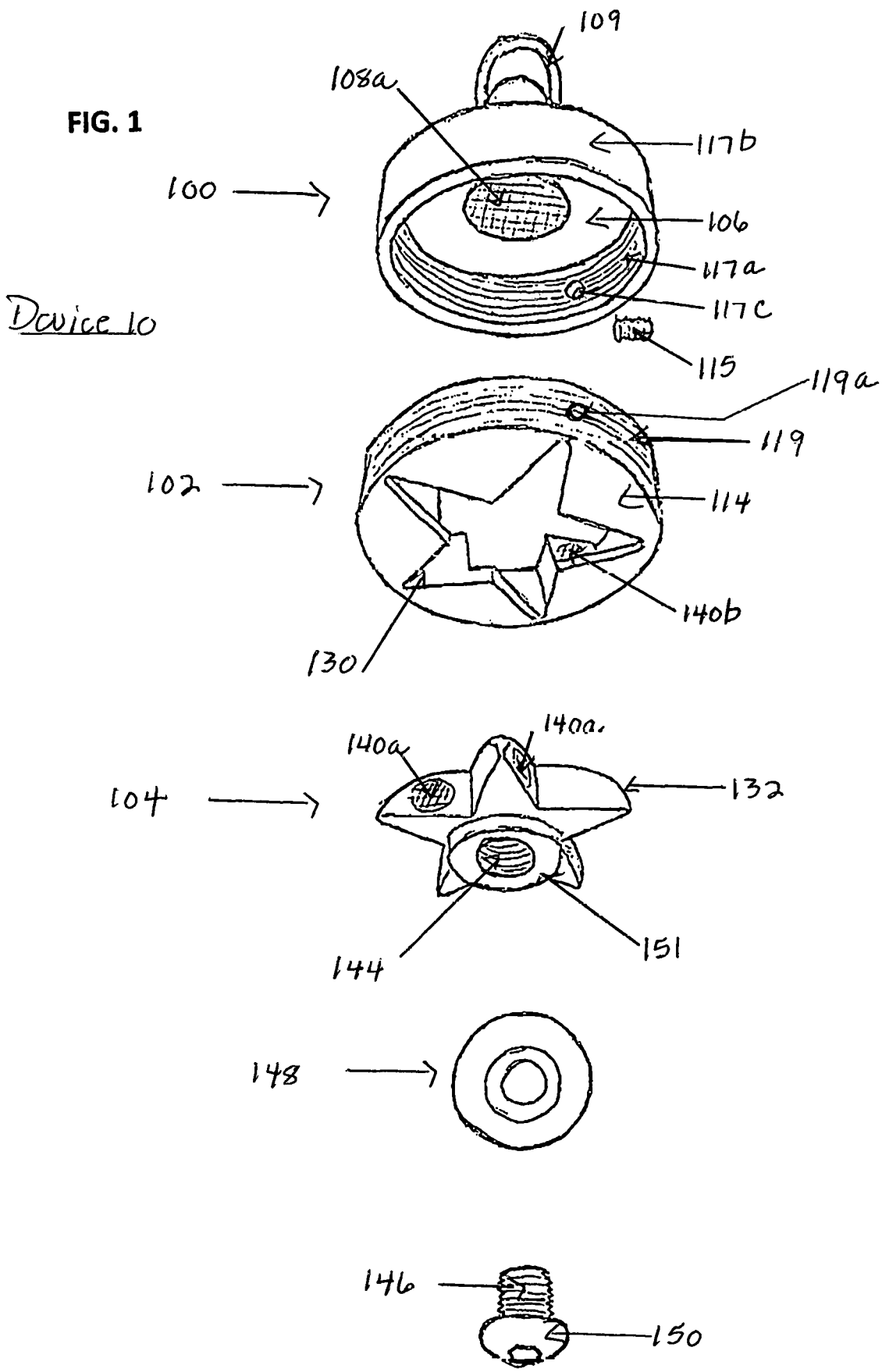
FIG. 1 is a perspective view showing the unassembled parts of the device in an exemplary embodiment and their order of assembly.
Figure 2A:
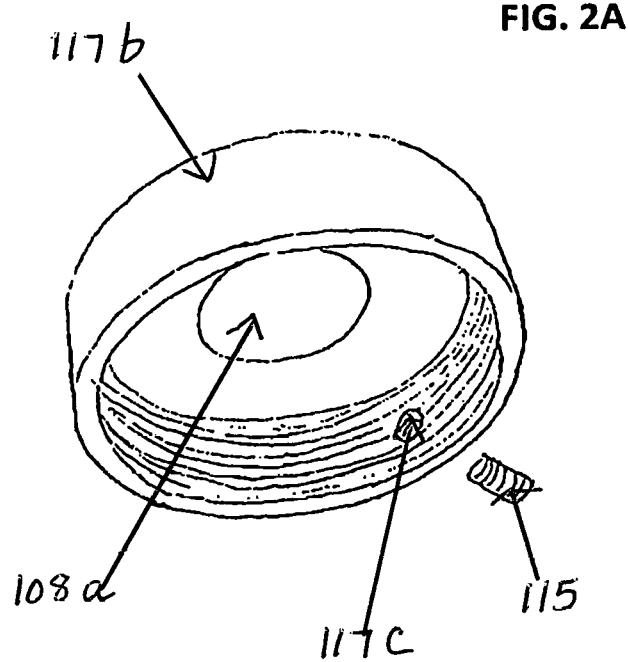
FIG. 2A is a perspective view showing the inside of the device's threaded armature element.
Figure 2B:
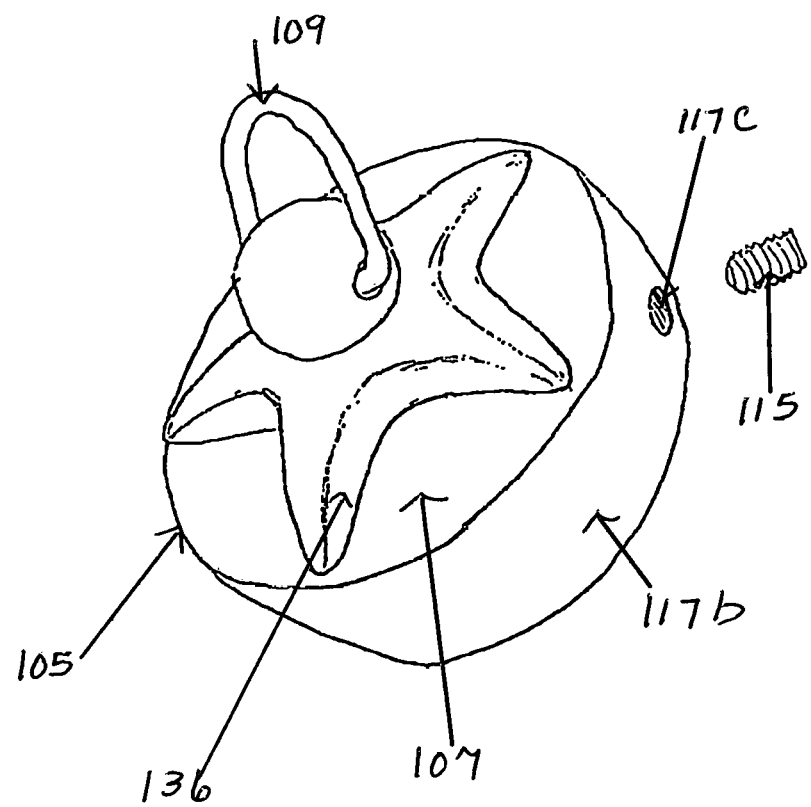
FIG. 2B is a perspective view showing the outside of the device's threaded armature element.

Referring to FIG. 1, in an exemplary embodiment, device 10 is comprised of a hollow, substantially cylindrical threaded armature element 100, a threaded female receptacle element 102, and a male insertion element 104. Referring again to FIG. 1 and now to FIGS. 2A and 2B, threaded armature element 100 has a top side 105, an inner surface 106, and a circular side wall. A ring such as a D ring or closed loop 109 is secured to substantially to the center of top side 105. Armature element 100's circular side wall comprises a smooth outer side 117b and an inner threaded side 117a. A magnet 108a is affixed substantially centrally to inner surface 106. Armature element 100 also optionally comprises a small hole 117c extending from smooth outer side 117b through inner threaded side 117a.

Referring again to FIG. 1, and now to FIGS. 2A, 2B, 4C, 5A, 5B, and 11D, threaded female receptacle element 102 is comprised of a threaded outer wall 119, a top side 112, a bottom side 114 having a substantially centered outer aperture 110b, and an internal cavity 110a for reversibly securing male receptacle element 100 within threaded female receptacle element 102 as discussed below. Threaded outer wall 119 optionally includes a small hole 119a extending partially through threaded wall 119. Optional hole 119a is generally included if threaded armature element 100 includes hole 117c.

Internal hollow cavity 11a comprises five substantially rectangular holding chambers 111 projecting outwardly from the center of cavity 110a. Chambers 111 are substantially evenly distributed around the circumference of threaded female receptacle element 102. All chambers 111 include a back wall 113a and two opposite lateral walls 113b and 113c. For orientation purposes, lateral wall 113b is referred to as the magnet-bearing lateral wall and 113c as the non-magnet-bearing lateral wall of holding chamber 111. A magnet 140b is affixed to one or more of lateral magnet-bearing walls 113b. See FIGS. 5A and 11D.

Figure 11A:
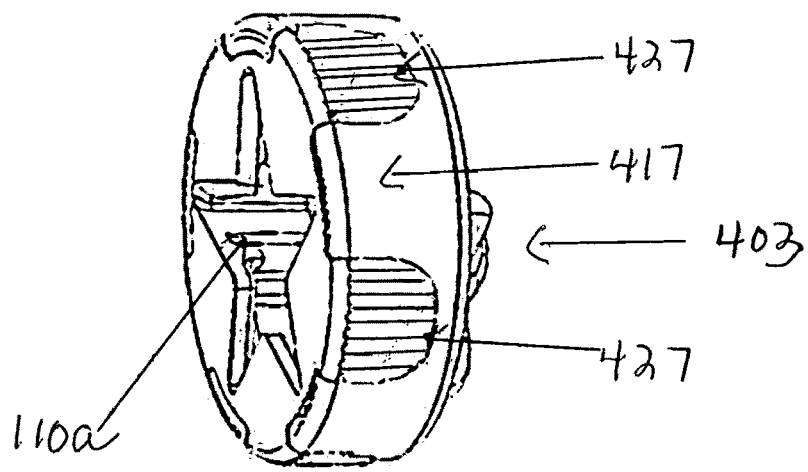
FIG. 11A is a side perspective view of the assembled the cap of embodiment of the device shown in FIG. 8.
Figure 11B:
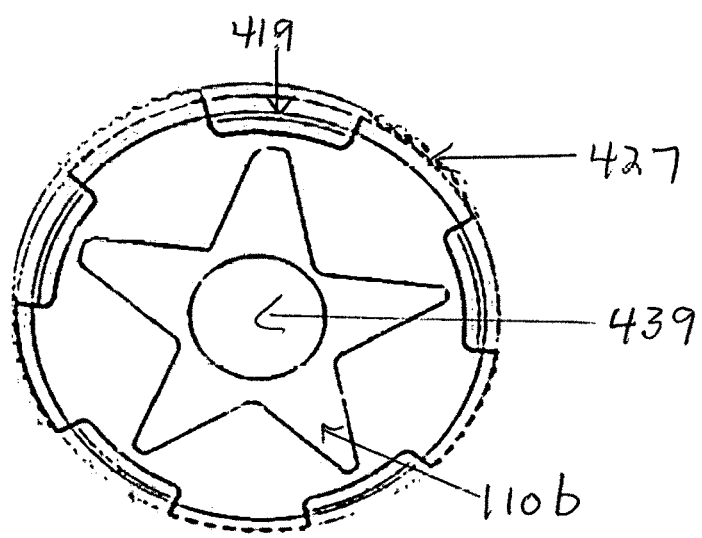
FIG. 11B is a top planar view of the cap (hook not shown) of the assembled cap for the embodiment shown in FIG. 8.
Figure 11C:
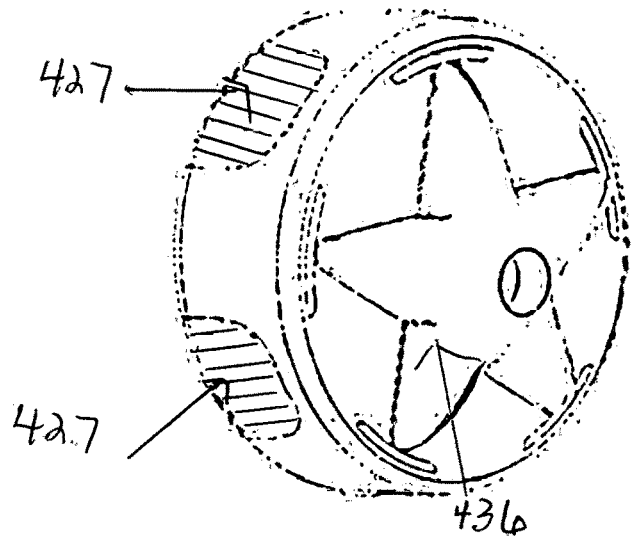
FIG. 11C is a side top perspective view of the assembled cap (loop not shown).
Figure 11D:
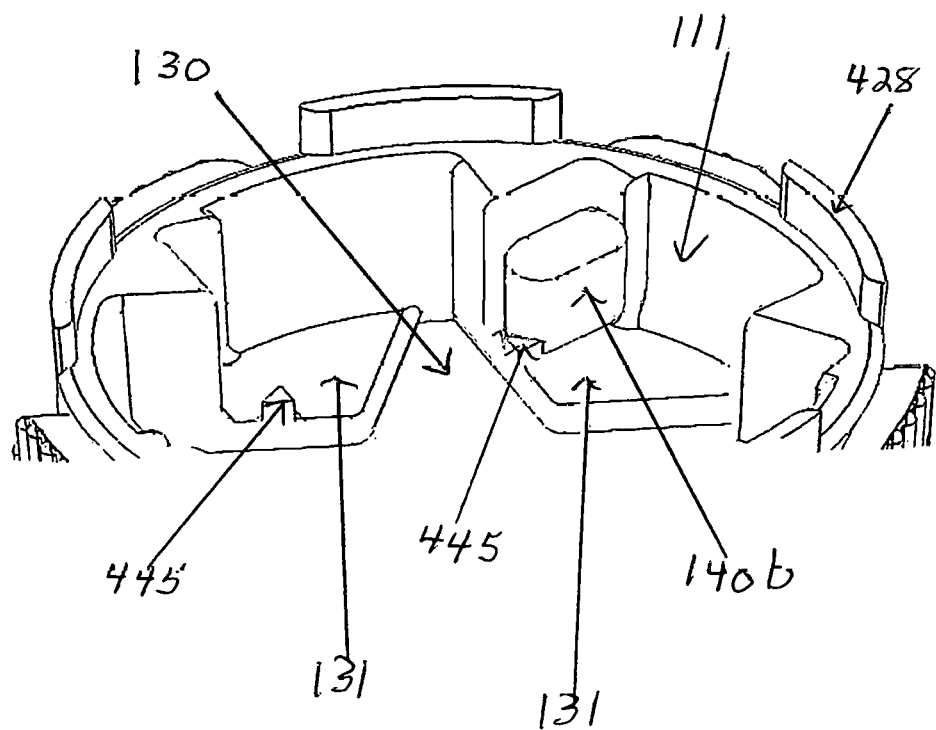
FIG. 11D is a perspective cut-out view of a female receptacle element showing the holding chambers of the receptacle's interior cavity. This structure is present in all of the disclosed embodiments.

Referring now to FIG. 11D, the floor of each chamber 111 comprises a resting platform 131 adjacent to a substantially triangular-shaped opening 133, each opening 133 having dimensions at least as great as the dimensions of triangular openings 130 of outer aperture 110b comprising male insertion element 104 as discussed below.

Referring again to FIGS. 1, 4A, 5A and 5B, and FIG. 11D, outer aperture 110a comprising the bottom side 114 of threaded female receptacle element 102 is in the shape of a regular star polygon having five triangular-shaped openings 130 extending outwardly from substantially the center of aperture 110a. Each triangular opening 133 adjacent to the resting platforms 131 of holding chambers 111 is substantially aligned with one of the triangular openings 130 of outer aperture 110b when device 10 is not in use or cap 103 is in its unlocked position.

Figure 4A:
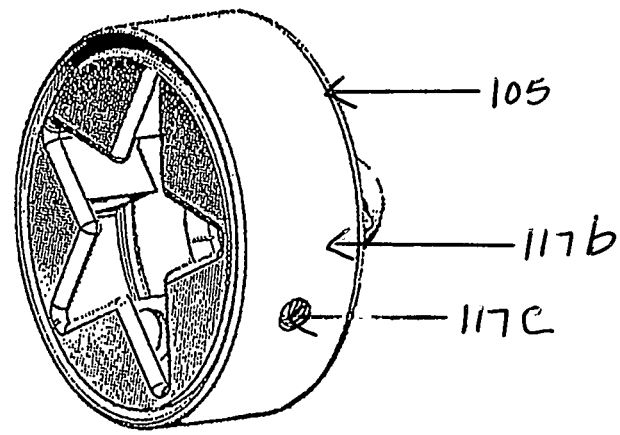
FIG. 4A is a side perspective side view of the exemplary embodiment's cap.
Figure 4B:
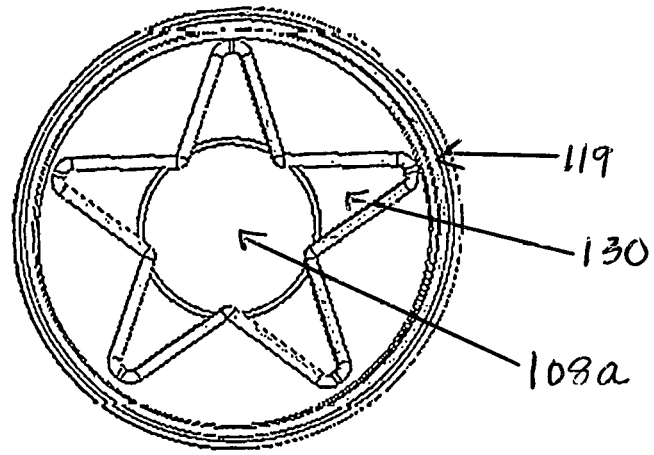
FIG. 4B is a bottom planar view of the exemplary embodiment's cap showing the threaded female element's visible outer star-shaped aperture.
Figure 4C:
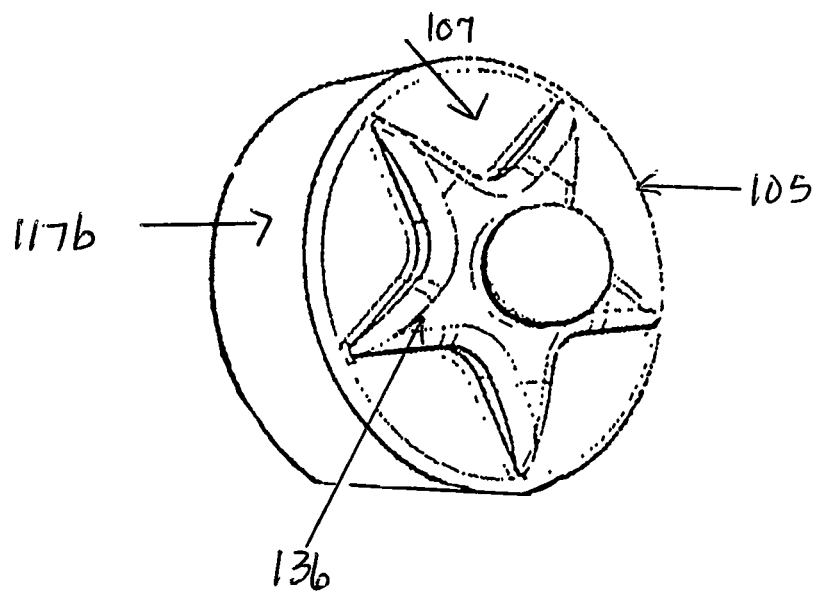
FIG. 4C is a side perspective view of the cap (hook not shown) which appears substantially the same for any of the invention's embodiments.

Referring again to FIGS. 1, 2A, 2B and now FIGS. 4A, 4B, and 4C, threaded armature element 100 and threaded female receptacle element 102 are assembled to provide cap 103 by screwing threaded female receptacle element 102 into threaded armature element 100. Holes 119a and 117c accommodate a small screw 115 or equivalent connecting-hardware for securing elements 100 and 102 to aid in the prevention of unthreading or loosening of element 102 from element 100. Upon complete threading of threaded female receptacle element 102 into threaded armature element 100, holes 119a and 117c are aligned to allow insertion of screw 115. When cap 103 is assembled, magnet 108a may be seen by peering through outer aperture 110a and hollow cavity 110b.

Figure 3A:
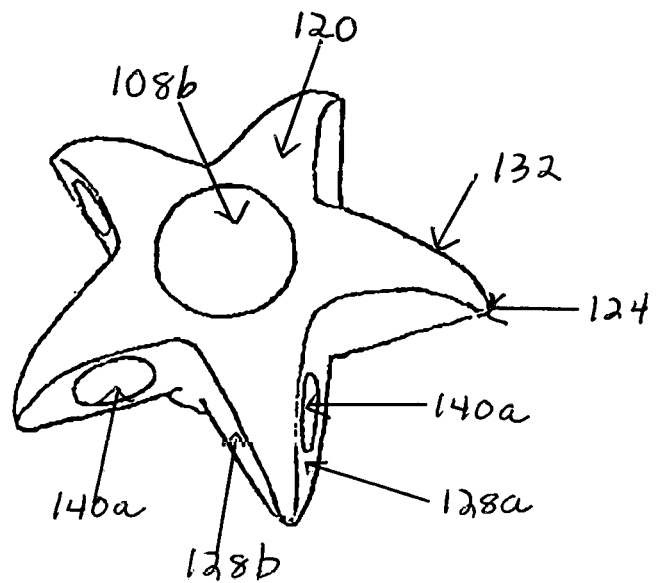
FIG. 3A is a top perspective view of an exemplary embodiment of the male insertion element.
Figure 3B:
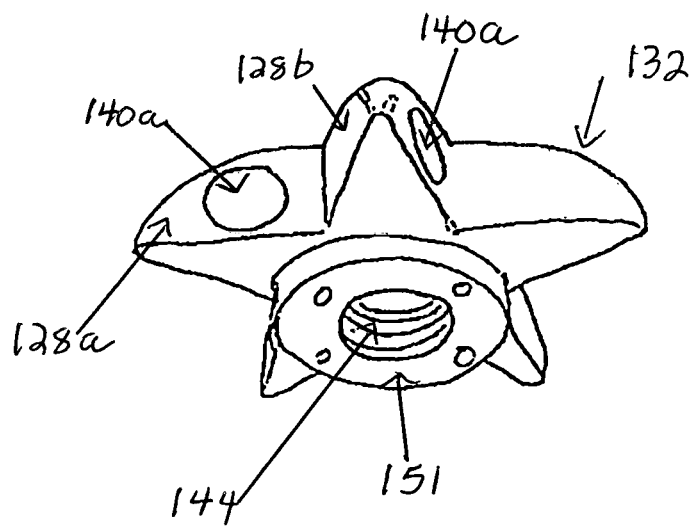
FIG. 3B is a bottom perspective view of an exemplary embodiment of the male insertion element shown in FIG. 3A.

Referring again to FIGS. 1, 3A and 3B, male insertion element 104 comprises a solid, regular star-shaped polygon substantially equivalent in shape of the star polygon shape comprising aperture 110b to provide for unimpeded insertion of male insertion element 104 through aperture 110b and into triangular openings 133 comprising holding chambers 111. Accordingly, male insertion element 104 comprises five solid triangular projections 132 wherein each triangular projection 132 further comprises a point 124 and a pair of lateral sides 128a and 128b. For orientation purposes, lateral wall 128a refers to the magnet-bearing side and lateral wall 128b refers to non-magnet bearing lateral wall. side.

Additionally, male insertion element 104 includes a magnet 108b affixed substantially to the center of the outer surface of its top side 120. Magnet 108b is of opposite polarity to magnet 108a affixed to the inner surface 106 of threaded armature element 100.

Referring again to FIGS. 1, 3A, 3B, 5A, and 11D, magnet 140a is affixed to one or more of the magnet-bearing sides 128a of male insertion element 104. Magnets 140a are of opposite polarity to magnets 140b affixed to magnet-bearing lateral sides 113b of holding chambers 111 of threaded female receptacle element 102. Generally, one magnet is present per magnet-bearing side 128a or 113b. However, fewer or more magnets may be affixed depending upon the application, strength of the magnets, etc.

Referring again to FIG. 1 and now to FIGS. 5A, 5B, 5C, 5D, 11D, and 12 device 10 is fully assembled when male insertion element 104 is inserted through outer aperture 110b (regular star polygon aperture) of assembled cap 103 by aligning triangular projections 132 of male insertion element 104 with the cap's triangular openings 130 contained within outer aperture 102a and pushing cap 103 onto aligned male insertion element 104. This pushing action causes triangle projections 132 to become ensconced within triangular openings 133 of holding chambers 111. Once cap 103 is placed onto male insertion element 104, the attractive forces between magnets 140a and 140b cause cap 103 to rotate to bring magnets 140a and 140b into close proximity as the result of the attractive magnetic forces between magnets 140a and 140b. The width 134 of holding chamber 111 defines the space available for the magnet-induced rotation of magnets 140b towards the corresponding magnet 140a of male insertion element 104. Once this automatic rotation has occurred, device 10 is in its locked position.

Magnets 108a and 108b provide for additional magnetic attractive forces between male insertion element 104 and cap 103. Magnets 140a and 140b provide magnetic attractive forces between the male insertion element 104 and the threaded female receptacle element 102. This dual magnet design helps ensure that the device 10 remains fully assembled during usage. As the result of the placement of magnets 140a and 140b on magnet bearing walls 113b and 128a device 10 provides a magnetic-based rotational mechanism for ensuring that the male insertion element 104 does not separate from the threaded female receptacle element during usage. Magnets 108a and 108b may not be needed if magnets 140a and b have the requisite strength for achieving the invention's utility. Accordingly the invention must include at least a total of ten magnets within male insertion element 104 and holding chamber 111.

To overcome the attractive magnetic forces between magnets 140a and 140b when the device 10 is in its locked position, can 103 is manually rotated in a counterclockwise direction to provide the force necessary for overcoming the attractive forces between magnets 140a and 140b and simultaneously causing the rotation of triangular opening 133 such that is again aligned with one of the triangular openings 130 of outer aperture 110a. Once sufficient separation and alignment is achieved, cap 103 is readily separable from male insertion element 104 by providing an upward lifting motion for overcoming the attractive forces between magnets 108a and 108b, if present, and causing triangular projections 132 to move through the aligned triangular openings 130 and 133.

More than one magnet 140a or 140b may be affixed to each of the magnet bearing sides 128a (male insertion element 104) and 113b (holding chamber 111). Generally, all magnet-earing walls include at least one magnet. The sizes and strengths of magnets 140a and 140b may be altered to achieve the desired total attractive magnetic forces depending upon device 10's particular application. Referring again to FIGS. 5A-5D, the optimal magnetic attractive force between magnets 140a and 140b is the total cumulative attractive force causes cap 103 to both firmly remain in its locked position (FIG. 5D) and yet be readily removed upon rotation of cap 103 to overcome these attractive forces. As is further disclosed below, the operation of the device 10 requires that magnets 140a and 140b affixed to magnetic-bearing sides 113b or 128a provide sufficient attractive magnetic forces to cause automatic rotation of cap 103 once male insertion element 104 is inserted through triangular openings 130 and 133, to achieve the locked position shown in FIG. 5D. The dimensions of triangular openings 130 and 133 are sufficient to slidingly receive and substantially accommodate the five triangular projections 132 of male insertion element 104.

Figure 6:
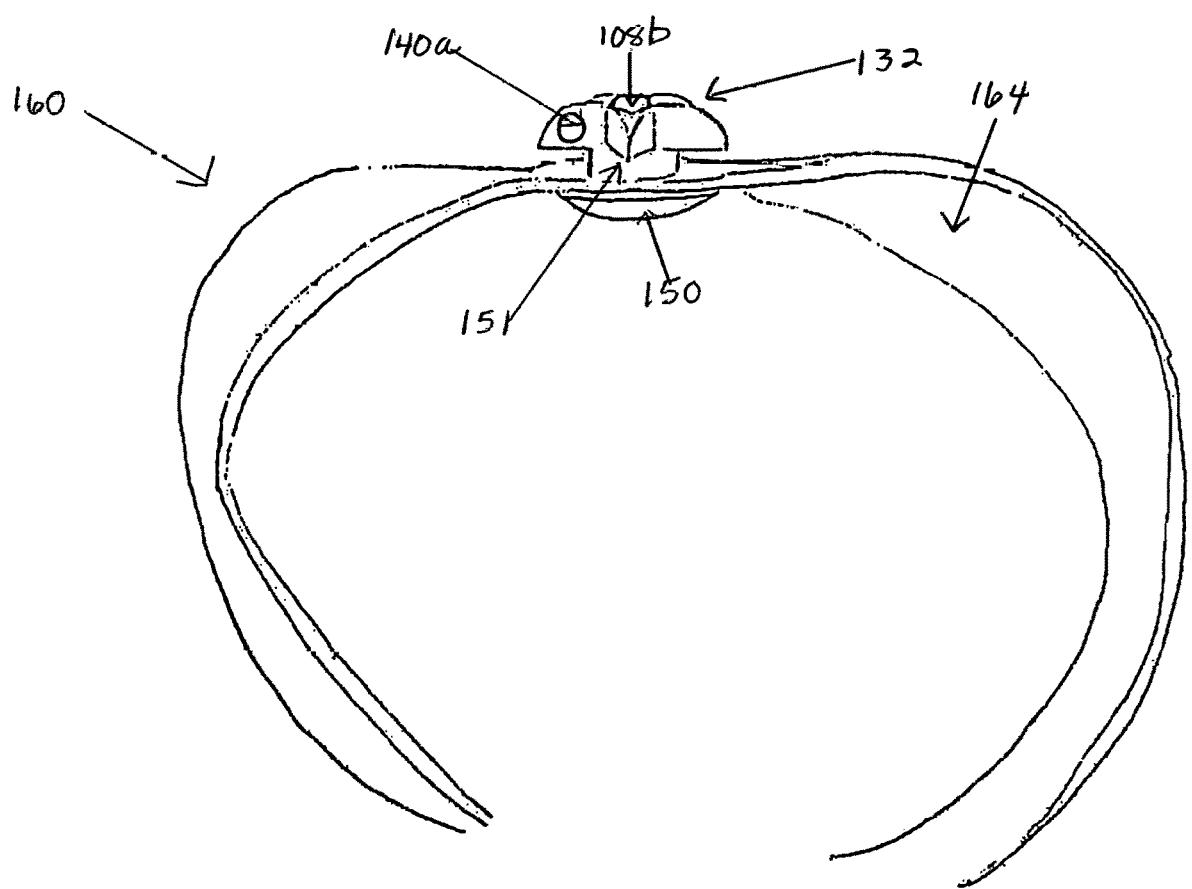
FIG. 6 is a perspective view showing the male insertion element secured to an animal collar.
Figure 7:
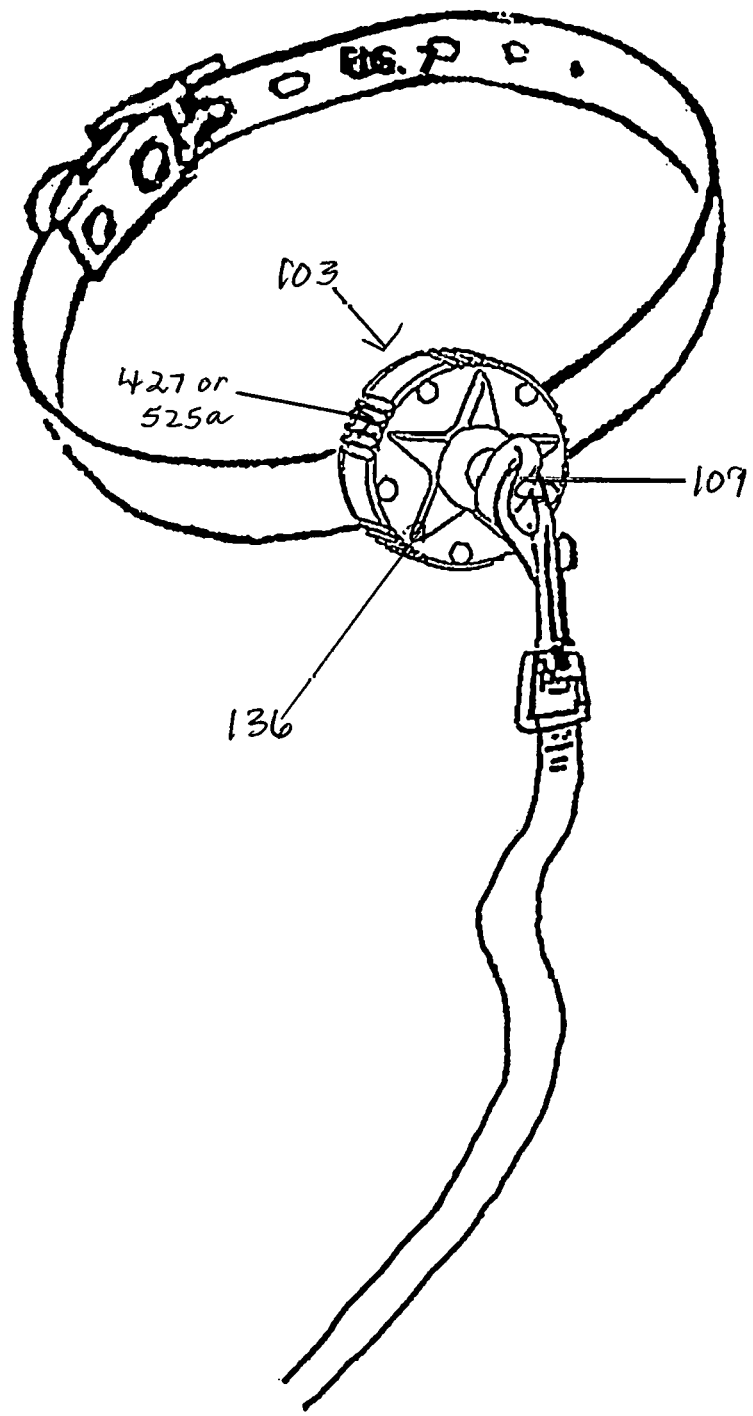
FIG. 7 is a perspective view showing the device's cap attached to a animal collar and a leash attached to the cap's loop.

Referring to again to FIGS. 3B and 6 and now FIG. 7, the operation of device 10 provides for the reversible attachment of a tether using disclosed inventive magnetic connector device 10 to a animal collar, purse, or other object. The operation of device 10 requires that male insertion element 104 be initially tightly secured to, e.g., an animal collar. Referring again to FIGS. 1, 38, and 14B, in an embodiment, male insertion element 104 comprises a substantially protruding base member 151 from the bottom side of male insertion element 104 where the base member has a threaded socket 144 for receiving a threaded screw or nut 146. An optional washer 148 may be used to help distribute the load of screw 146, once it is threaded inserted into the threaded socket 144.

Referring again to FIGS. 6 and 7, male insertion element 104 is first secured to animal collar 160 which generally needs to be modified to include a hole 162 of sufficient size for slidingly receiving screw 146 or fastening hardware used to secure male insertion element 104 onto the animal collar. Generally, the hole 162 is positioned opposite the collar's buckle or snap. Once screw 146 is passed completely through hole 162 and the screw's head 150 is flush with the inner side 164 of collar 160, washer 148 is placed onto the screw 146. Collar 160 is then tightly-secured to male insertion element 104 by securely threading screw 146 into male insertion element 104's threaded socket 144 until screw 144's threaded portion is no longer visible.

As shown in FIG. 6, threaded socket 144 and protruding base member 151 maintain the position of male insertion element 104 slightly above the collar to which it is secured. Referring now to FIG. 148, threaded socket 144 may include small sharp protrusions 149 for further engaging male insertion element with collar 160. The leash is attached to the animal collar by hooking the leash onto loop 109 as shown in FIG. 7 either before or after cap 103 has been inserted onto male insertion element 104 and locked in place. Most users will likely have the leash already attached prior to securing cap 103 to prevent the potential difficulty in dealing with an active pet. Indeed, once of the invention's most desirable utilities is its ability to quickly secure a leash onto animal's collar.

Once secured to the desired animal collar or other object, the male insertion element 104 is intended to remain affixed. Device 10 is thus repeatedly useable by simply adding and removing the cap 103 and from the collar-affixed male insertion element 104. Referring again to FIG. 7, male insertion element 104 is not visible when cap 103 is in use.

Figure 8:
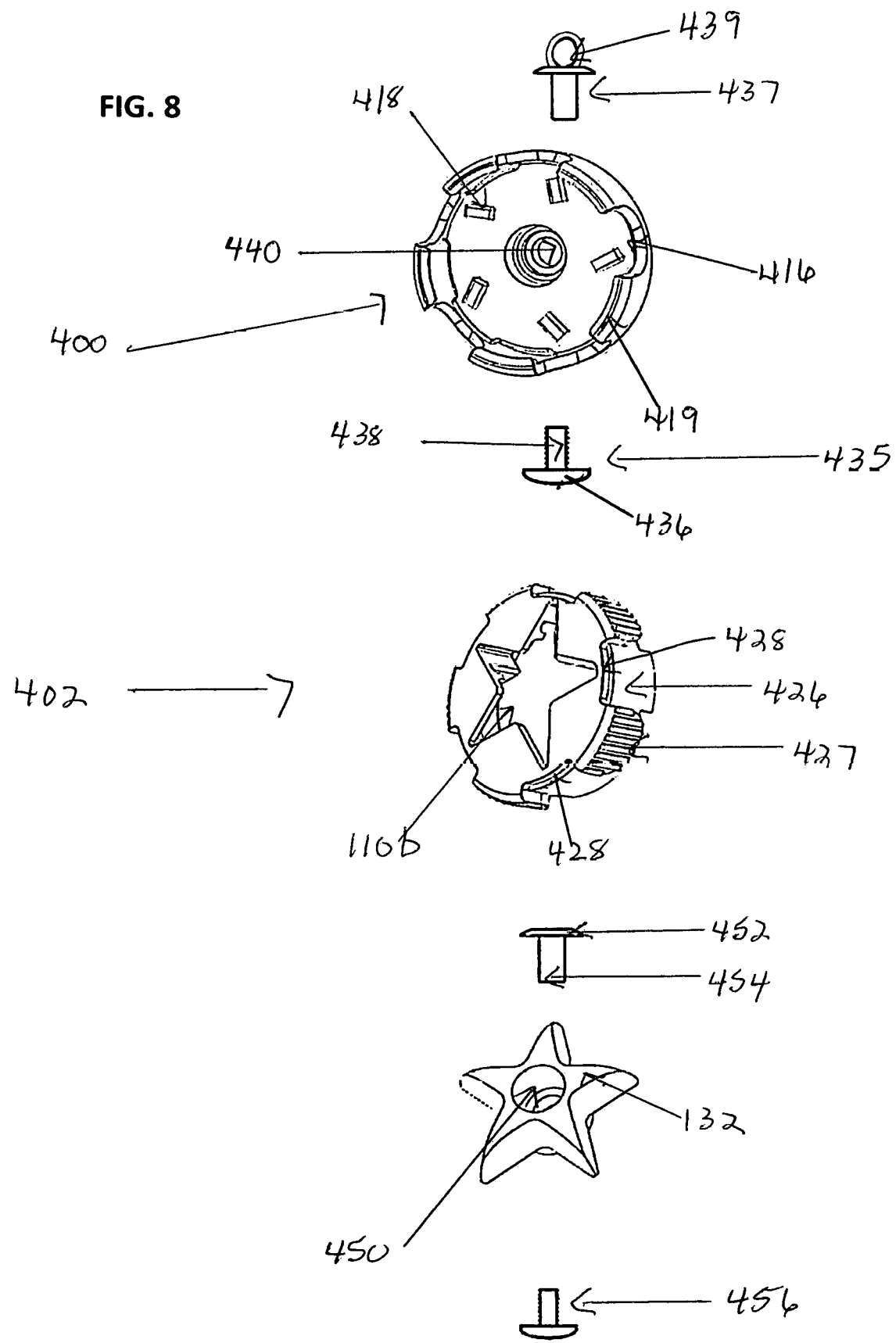
FIG. 8 is a perspective view of another embodiment of the device having recessed armature, grooved female receptacle element and male insertion element.
Figure 9:
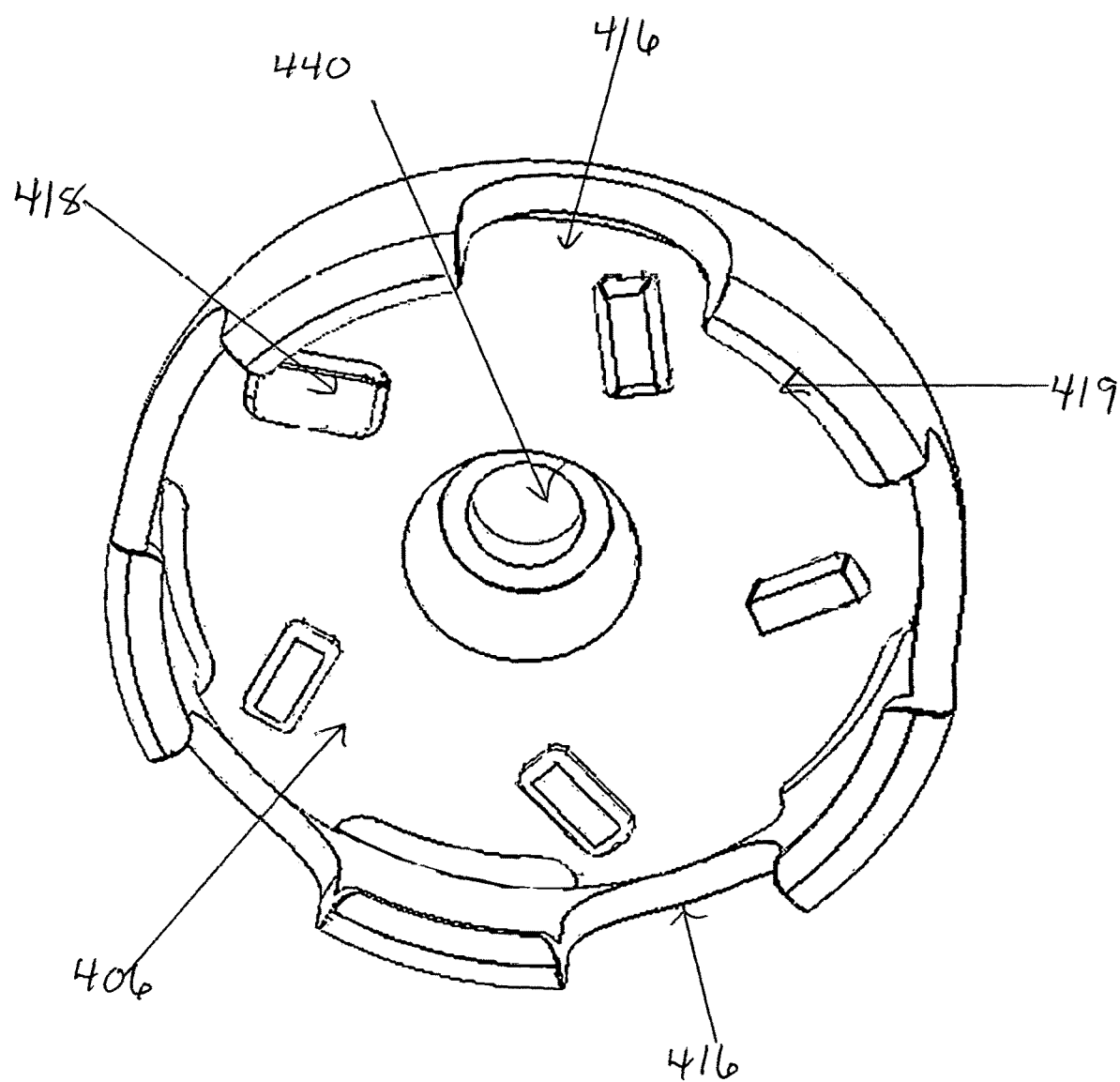
FIG. 9 is a perspective view showing the inside of the recessed armature of FIG. 8.
Figure 10:
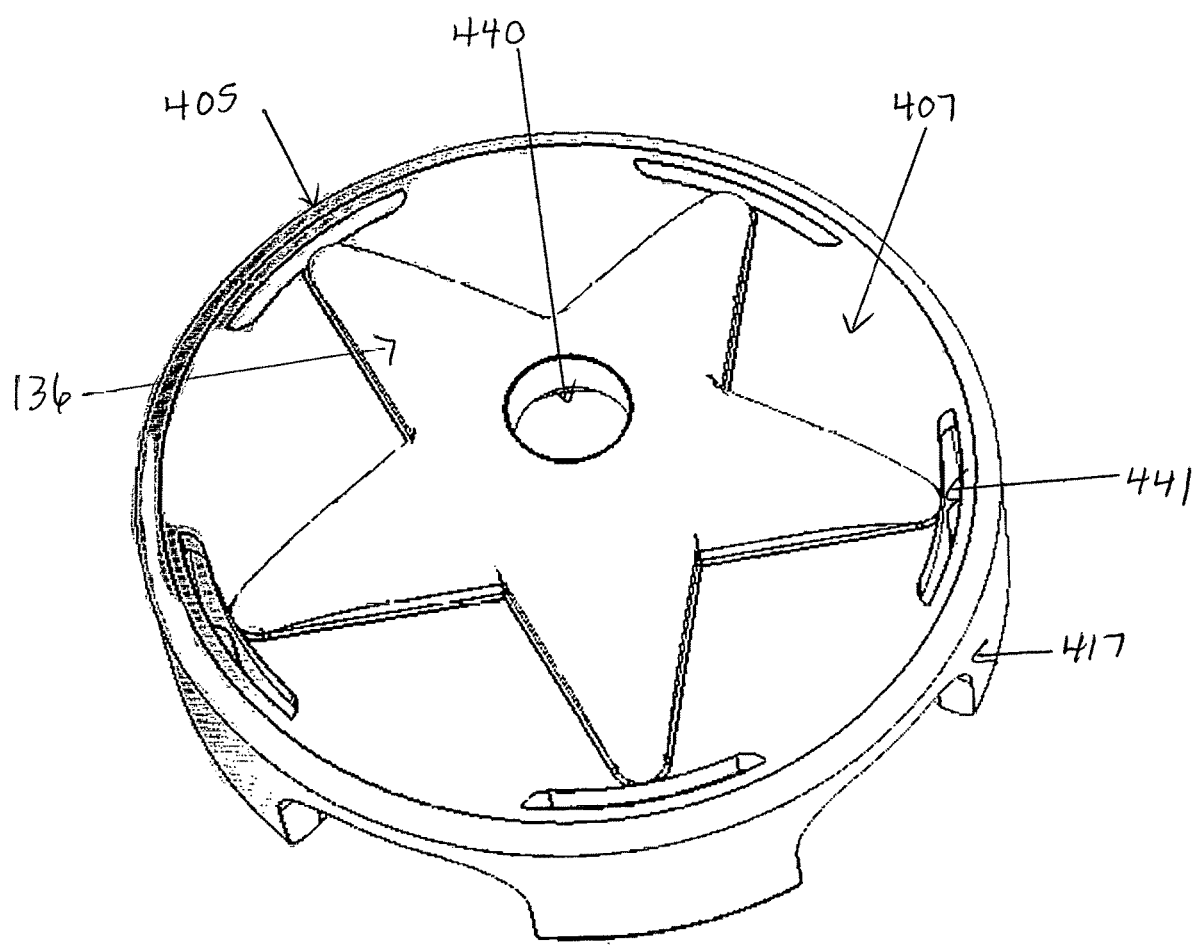
FIG. 10 is a top perspective view showing the top side of the recessed armature.

Additional embodiments of device 10 are now described. All embodiments operate using the magnetic-induced rotation mechanism described above for the exemplary embodiment. Referring now to FIGS. 8, 9, and 10, in another embodiment, a recessed armature 400 includes a top side 405 with an outer surface 407, an inner surface 406 and side wall 417. In this embodiment, side wall 417 is not of uniform death but comprises a plurality of evenly distributed concave recesses 416 extending upwardly from bottom edge 419 of side wall 417 substantially towards top side 405.

Referring again to FIGS. 8, 9 and 10, the inner surface of recessed armature element 400 includes a plurality of substantially rectangular protrusions 418 projecting outwardly from the inner surface 406 of top side 405. Protrusions 418 are distributed substantially evenly around the circumference of inner surface 406 at positions that will cause them to be atop magnets 440b when cap 403 is assembled as described below. Top side 405 of recessed armature 400 includes five substantially evenly spaced substantially rectangular slots near the perimeter of top side 405.

Referring again to FIG. 8 and now FIG. 11A, grooved female receptacle element 402 comprises a side wall 421 having evenly spaced armature 400 engaging portions 427 separated by ungrooved portions 426. Engaging portions 427 comprise grooves or ribs. Accordingly, side wall 421 has alternating areas of smooth portions 426 areas and grooved portions 427. The number of engaging portions 427 of grooved female receptacle 402 is equal to the number of concave recesses 416 of recessed armature 400. Five concave recesses 416 and engaging portions 427 are shown in FIGS. 8 and 11A for illustrative purposes. Referring again to FIG. 10, top side 105 of recessed armature 400 includes a plurality of lip engagement slots 411 evenly distributed around top side 105's perimeter.

The bottom edge of each smooth portion 426 comprises an elongated lip 428 for insertion into lip engagement slots 411 of armature 400. Lip engagement slots 411 are of sufficient length and width to secure an elongated lip 428.

Referring now again to FIGS. 8, 10, and 11A, cap 403 is assembled by grooved portions 427 of grooved female receptacle element 402 with the concave recesses 416 of recessed armature 400 and then pushing armature 400 onto the female receptacle 402 causing each grooved areas 427 to become nested within an aligned concave recess 416 and elongated lips 418 to become inserted through engagement slots 411. Referring again to FIG. 11C, the outer wall of cap 403 comprises visible side wall portions 417 alternating with grooved portions 427 of inserted grooved female receptacle 402.

Referring again to FIGS. 8, 9 and 10 recessed armature 400 comprises a recessed opening 440 extending completely through substantially the center of its top side 405 for receiving the threaded portion of magnetic screw 435 having a magnetic head 436. Magnetic screw 435 is secured in place prior to the assembly of cap 403 by threading threaded portion 438 into a receiving nut or bolt 437 or other appropriate hardware securing means. Nut or bolt 437 includes a hook 439 for securing a pet leash or other type of tether affixed to the top of the cap 403. Magnetic head 436 is of opposite polarity to magnet 450 of the male insertion element 404 as discussed below. In this way, magnetic head 436 serves the same purpose as magnet 108a in threaded armature element 100.

Referring again to FIGS. 11A and 11D and now FIGS. 11B, and 11C, grooved female receptacle element 402 includes the outer star-shaped aperture, now referred to as 410a, as interior cavity, now referred to as 410b, and the rectangular holding chambers, now referred to as 411 as described above for threaded female receptacle element embodiment 102. In this embodiment, magnets 440b are shown to cover approximately one-half of the height of magnet-bearing walls 413b.

When cap 403 is assembled by inserting grooved female receptacle element 402 into recessed armature 400, the convex protrusions 418 of grooved armature element 400 positioned atop magnets 440b. The dimensions of convex protrusions 418 substantially equal to the width of lateral magnetic-bearing wall 413b and the distance between the top 409 of affixed magnet 140b and the top edge 425 of magnet-bearing wall 413b. Convex protrusions 418 assist in preventing the dislodging of magnets 440b during repeated usage. As with threaded female receptacle element 102, grooved female receptacle's internal aperture 411 includes holding chambers 411 having a resting platform 435 adjacent to triangular opening 433. As an alternative to including convex protrusions 418 in recessed armature 400 or in addition to convex protrusions 418, a magnet-securing post 445 may be affixed to the front top side of resting platform 435 to also assist in keeping magnets 440b in position. Obviously threaded female receptacle element 102 may also include magnet-securing post 445 and threaded armature element 100 may include convex protrusions 418 described for the present embodiment.

Figure 3C:
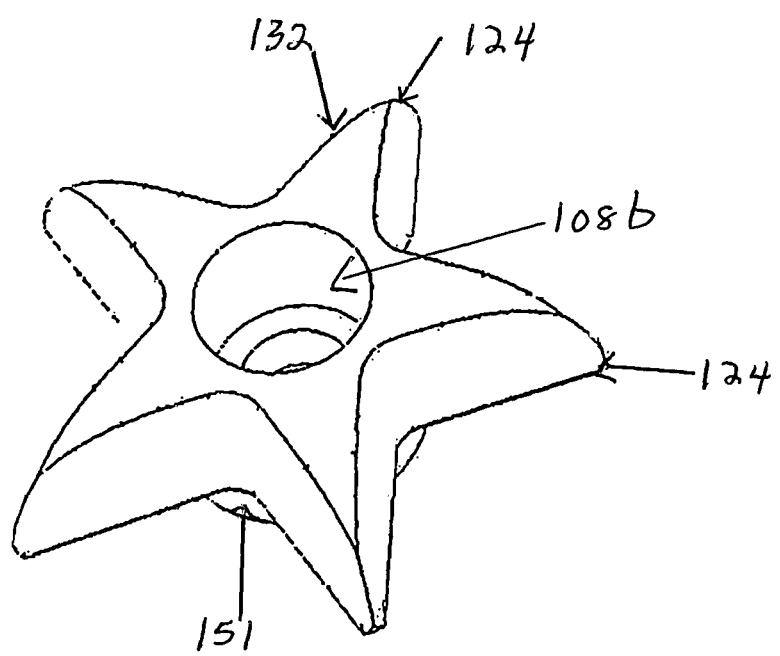
FIG. 3C is top perspective view of another embodiment of the male insertion element.
Figure 3D:
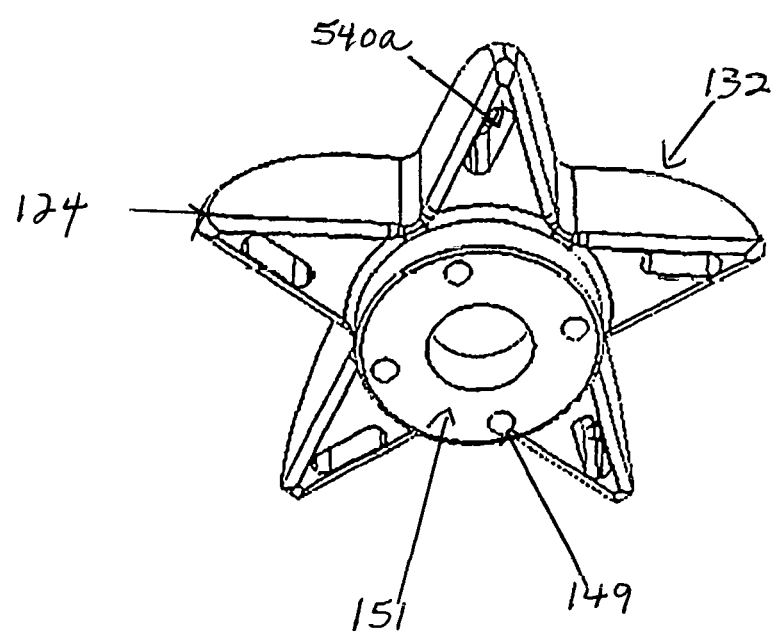
FIG. 3D is a bottom perspective view of another embodiment of the male insertion element wherein this element's magnets are disposed on the base of each triangular projection.

Referring again to FIG. 8, FIGS. 3C and 3D, an embodiment of male insertion element 404 includes a centrally positioned threaded hole 450 extending from its top side through a substantial portion of element 404. Here, magnetic screw 456 comprises a magnetic head of opposite polarity to recessed armature element 400's magnetic head 436. Recessed armature element 400 and male insertion element 404 may instead include magnets 108a and 108b as disclosed for embodiment 100 and 104 instead of magnetic screws wherein threaded holes 440 and 450 are not present.

Referring again to FIG. 6, male insertion element 404 is secured to an animal collar or other desired support strap as described above for the first embodiment. As such, male insertion element 404 includes the protruding base 151 with threaded socket 144 as shown in FIG. 1 for male insertion element 104.

All embodiments of the male insertion elements must include magnets on their triangular projections for operation of device 10. However, the location of these magnets can be altered depending on the overall strength of the magnets. For example, the male star element, common to all embodiments, is intended to remain on a dog collar once attached. It may therefore desirable to protect these magnets from damage or exposure to the elements to ensure the invention's long-term effectiveness. Accordingly, another desirable embodiment for the device's male insertion element is one where magnet 128a is instead secured on the base of each triangle projection 132. Referring again to FIG. 16 and now to FIG. 3D, this positioning does not impact the operation of device 10 with the usage of holding-chamber magnets 140b and triangular protection "base" magnets 140a having the requisite strength to maintain the device's locked position without substantially impeding unlocking of the device. For reference purposes, these "base-disposed" magnets are referred as 540a magnets.

In another embodiment, the invention's armature component may instead be adapted to itself include holding chamber 111. Such an embodiment reduces manufacturing costs by eliminating the need for the female receptacle element because the device's rotational functionality now resides within the armature component. Referring now to FIGS. 13, 14A, 14B, 15A, 15B, 15C, 16, 17A, 17B, 18A, 18B, and 18C, in this embodiment, the required star-shaped aperture 510b for receiving male insertion element 104 or 404 is provided by metal plate 502 having curved wall 524, a top side 526, a bottom side 528, and one aperture 510 of the same general shape star-shaped aperture 110b of the female receptacle element of the first and second embodiments and extending from top side 526 through bottom side 528.

Figure 15A:
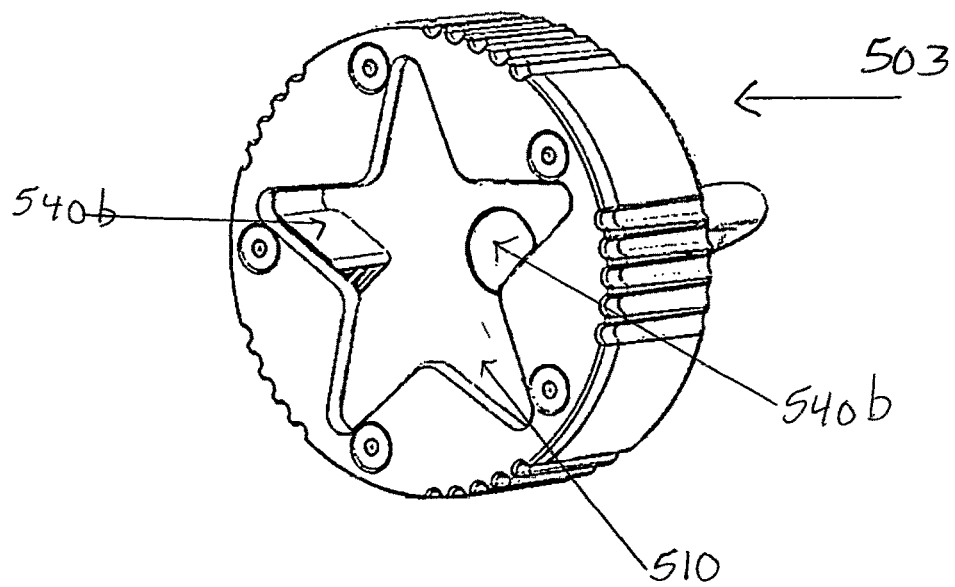
FIG. 15A is a side perspective view of the assembled cap of an embodiment of the device.
Figure 15B:
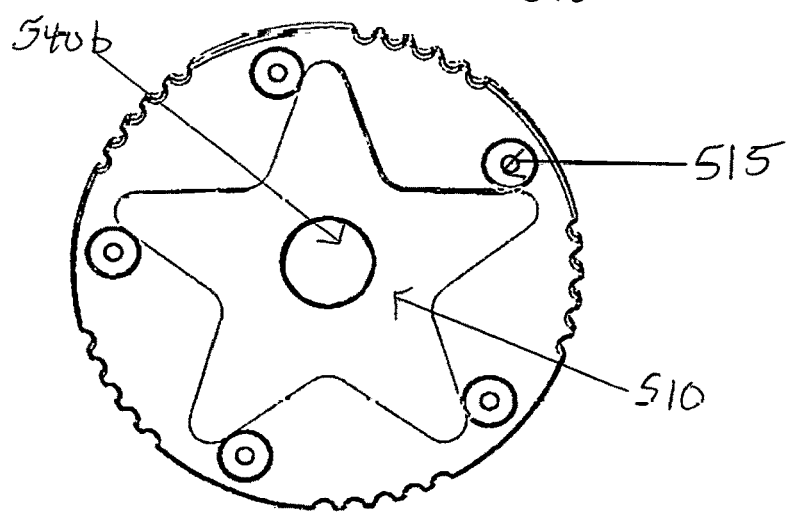
FIG. 15B is a top planar view of the top of the cap of an embodiment of the device.
Figure 15C:
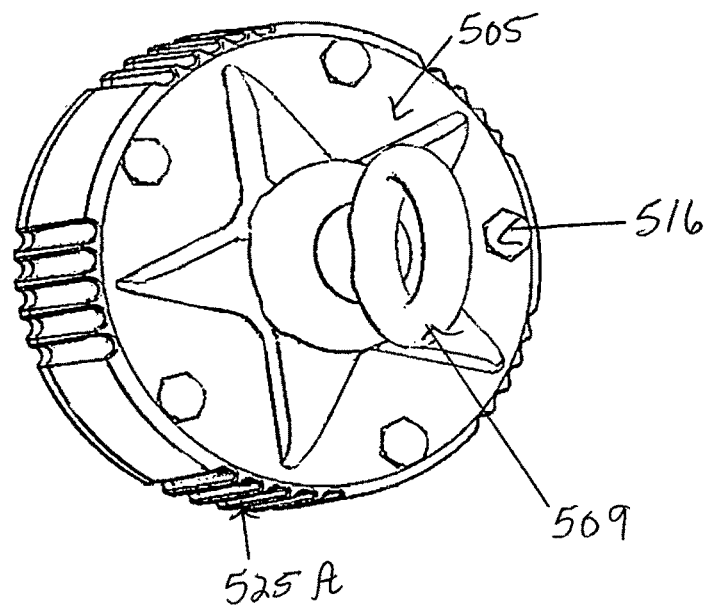
FIG. 15C is a perspective view of the cap of an embodiment of the device.
Figure 17A:
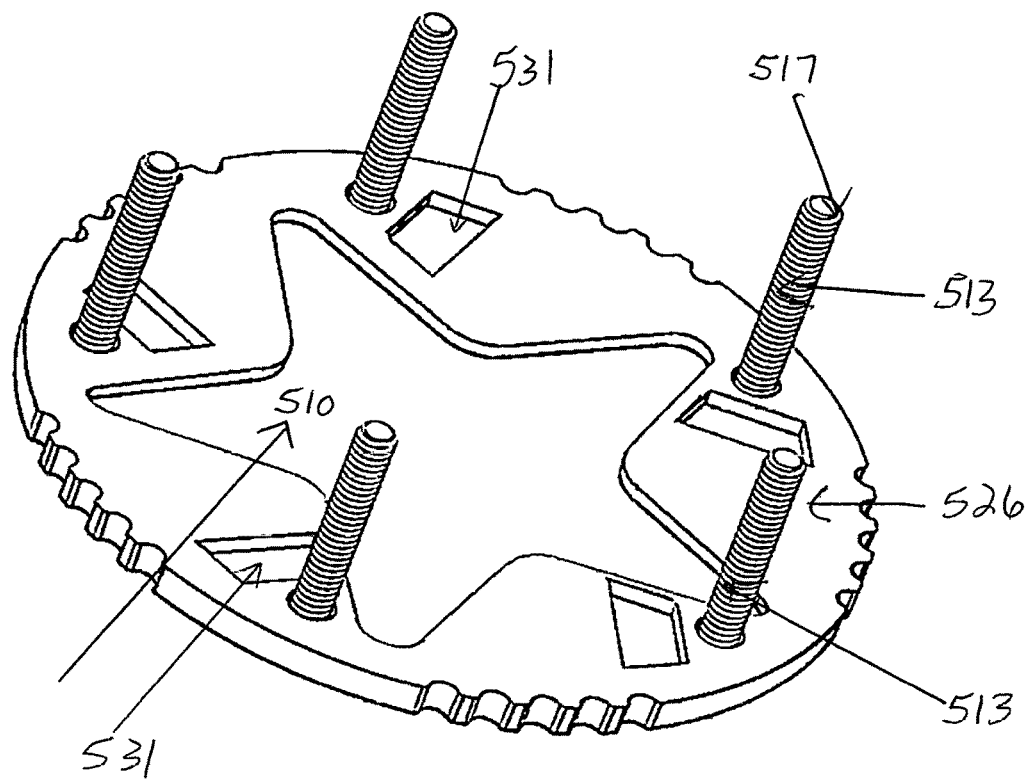
FIG. 17A is a perspective view of the top side of metal disc element of an embodiment prior to its attachment to the grooved armature element via the shown threaded screws.
Figure 17B:
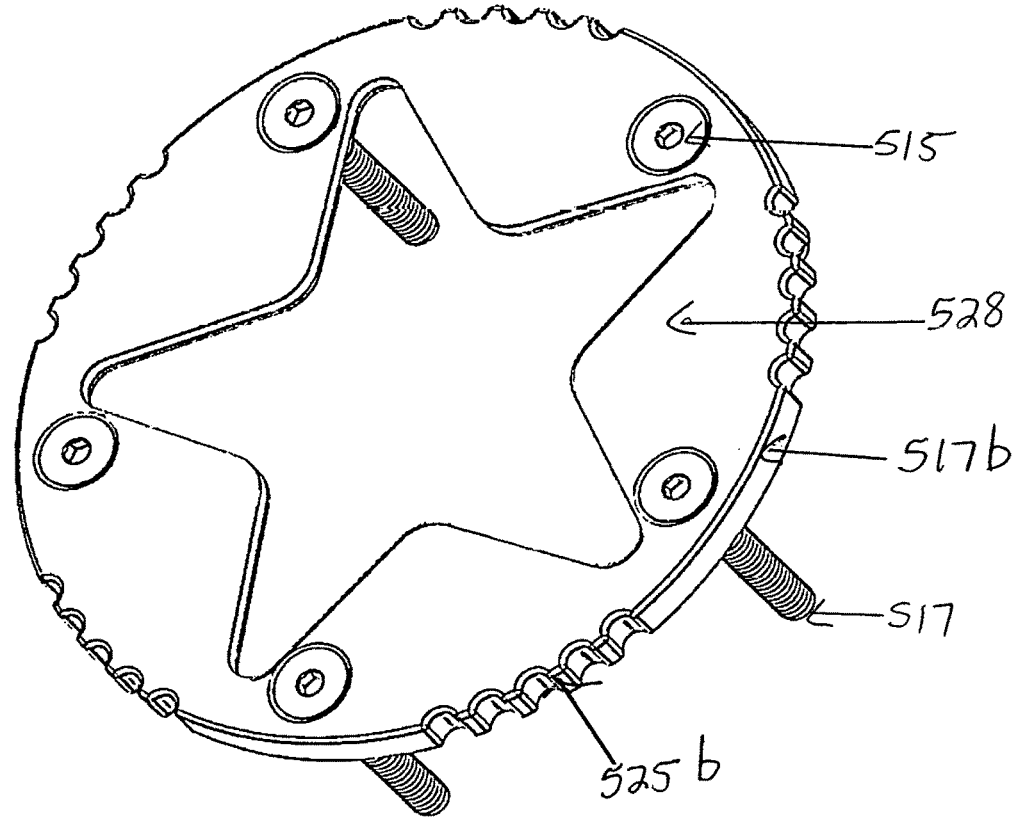
FIG. 17B is a perspective view of the bottom side of the metal disc element plate

Referring now to FIGS. 17A and 178, metal disc 502 is secured to armature 500 with five threaded screws 512 inserted through five holes 514a evenly distributed around the metal disc 502 and five holes 514b evenly distributed around the top side 505 of armature 500. To secure the armature 500 to metal plate 502, holes 514a are aligned with holes 514b such that the threaded portion 513 of screw 512 can be readily inserted through both holes 514a and 514b resulting in a female receptacle metal plate 502 that is parallel with the top side 505 of armature 500. All of the distal ends 517 of the inserted five threaded 512 screws protruding through holes 514b are capped with bolt caps 516 which are visible on the top side of armature 500 as shown in FIG. 15C. The heads 515 of screw 513 are visible on the bottom side of cap 503 as shown in FIGS. 15A and 15B.

Figure 16:
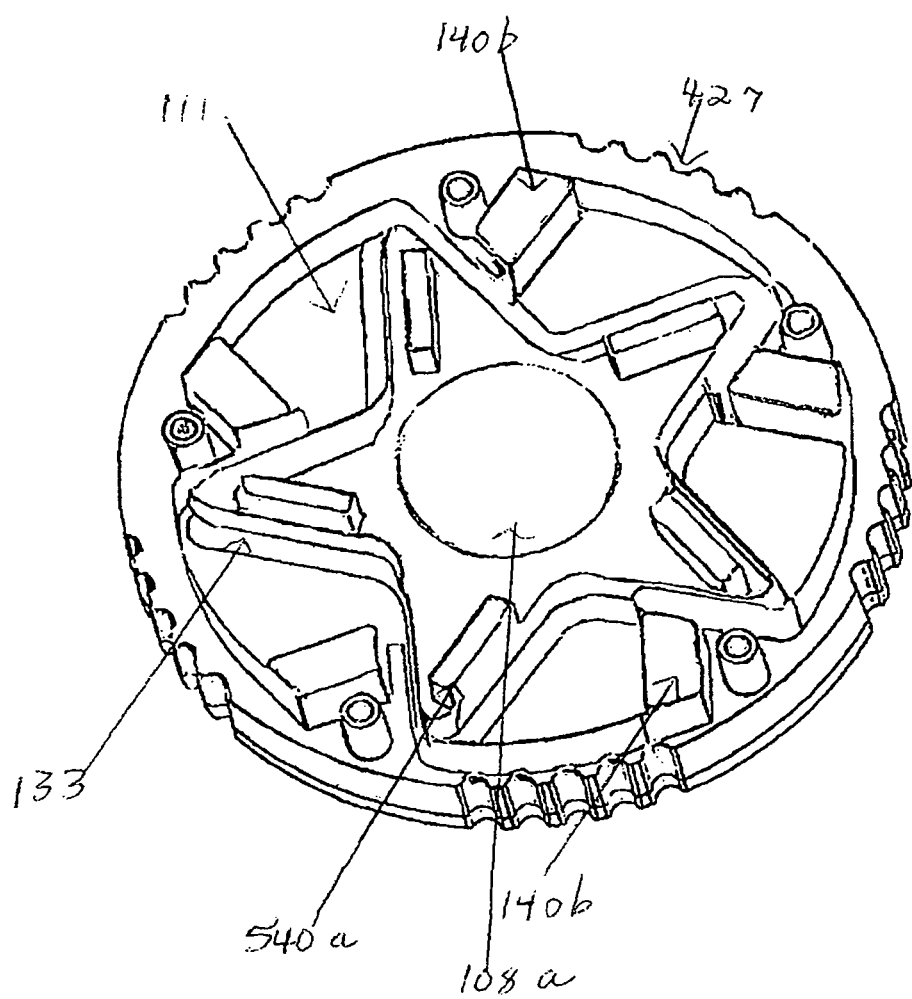
FIG. 16 is a bottom planar inside view of the assembled cap with a male insertion element having magnets disposed on the base of the element's triangular projections. Although difficult to depict, each triangular projection is aligned with one of the triangular openings of the holding chamber. Here the cap is in its unlocked position. The outer star-shaped aperture included in all embodiments is not shown.

In this embodiment, the interior of the invention's armature is adapted to include the entire structure of housing chamber 111 as shown in FIGS. 1, 11D and 16. Cap 503 comprises the adapted armature 500 secured to metal disc 502. This embodiment operates precisely as the other embodiments when cap 503 is inserted onto a male insertion element 104 or 404. The armature's interior cavity and holding chamber are substantially equivalent to the holding chambers comprising the disclosed female receptacle elements. Therefore, all embodiments, even though they may differ somewhat structurally, all work the same way. All embodiments utilize the inventive magnetic-induced rotation mechanism described above which requires the disclosed holding chamber's structural features in any embodiment to facilitate: 1) the proper insertion of the cap onto the male insertion element; 2) the resultant automatic magnetic-induced rotation of the cap to achieve a safe and secure leash-animal collar connection; and 3) readily manual reversal of the locked position to allow removal of the cap (and leash) from the animal collar.

Figure 5A:
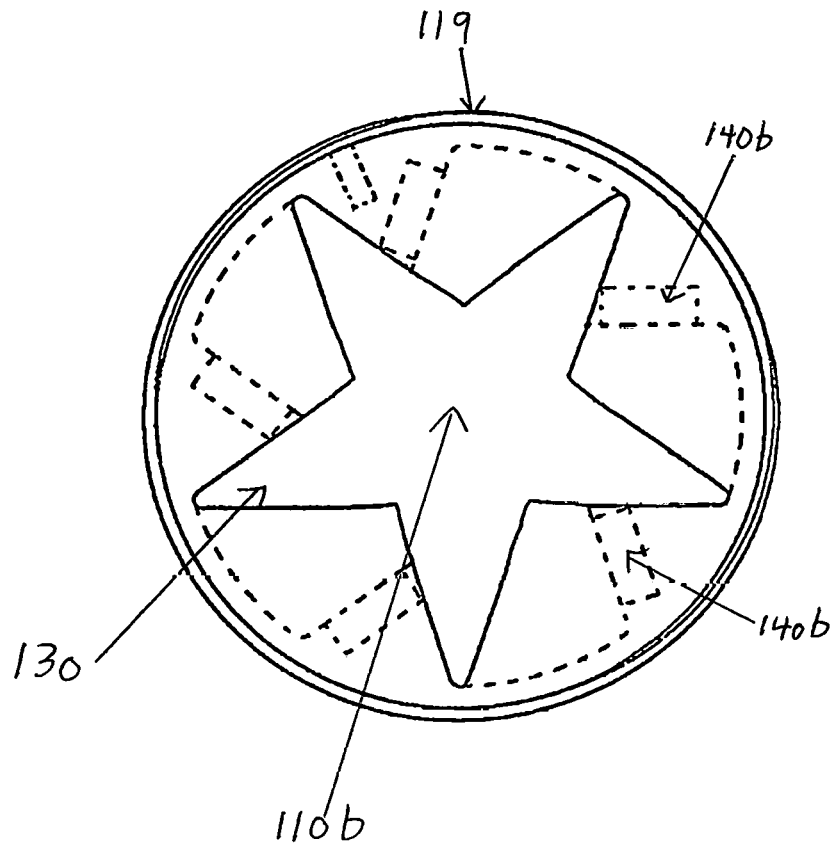
FIG. 5A is a bottom planar view of an exemplary embodiment of the device showing the threaded female receptacle element's outer star-shaped aperture and the interior cavity for reversibly securing the device's male insertion element.
Figure 5B:
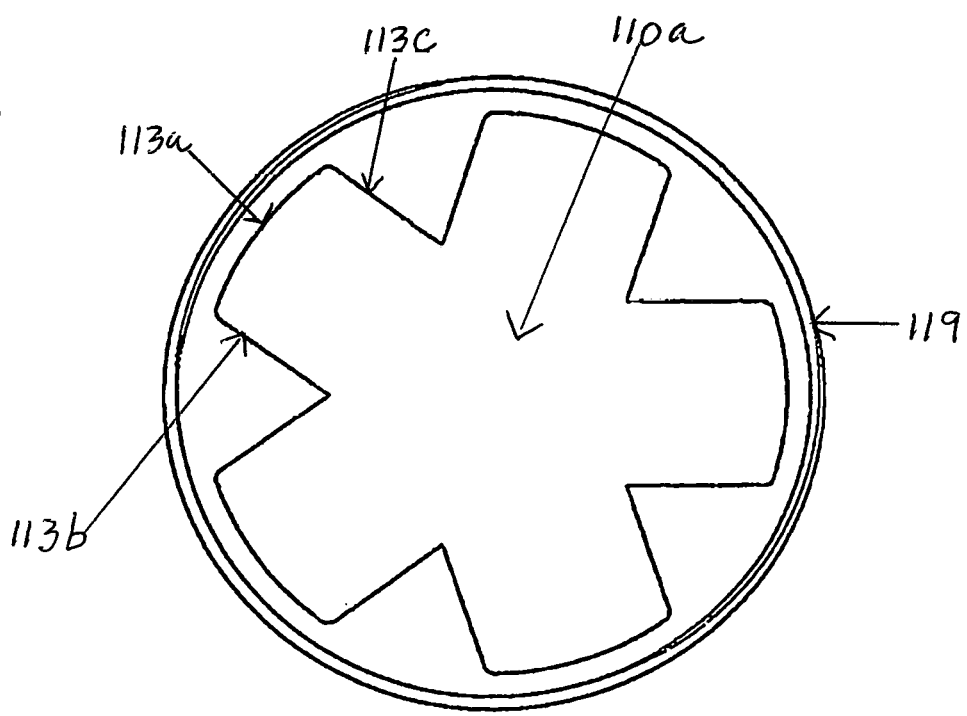
FIG. 5B is a bottom planar view of the threaded female receptacle element showing the internal cavity's rectangular holding chambers. Magnets are not shown.
Figure 5C:
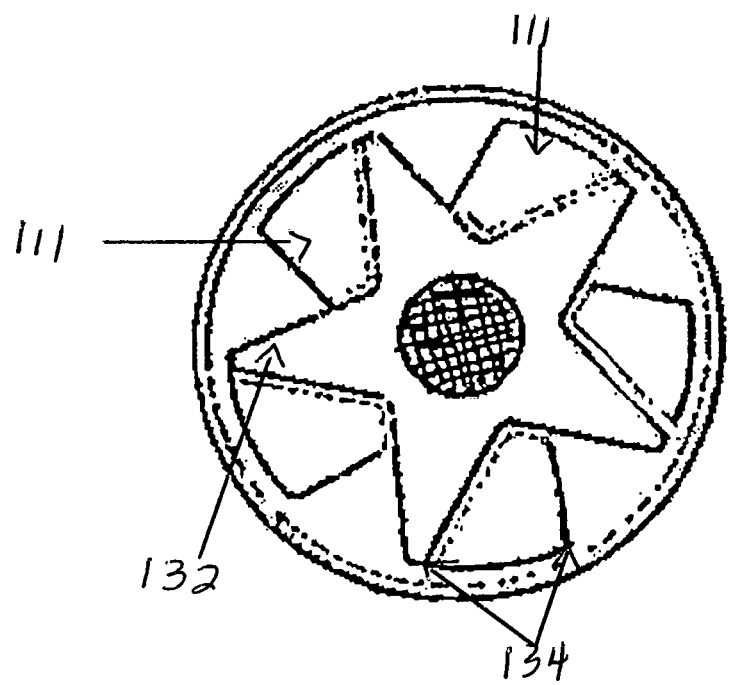
FIG. 5C is a bottom planar view of the inside of the device with the male insertion element's triangular projections inserted through the triangular-shaped openings of the threaded female receptacle element's outer aperture and into the holding chambers' triangular openings before the magnetic-induced rotation of the triangular projections. Here, the device is in its unlocked position.
Figure 5D:
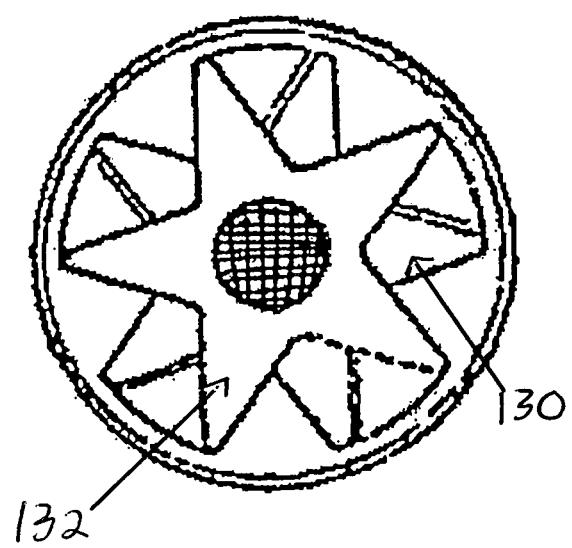
FIG. 5D is a bottom planar view of the inside of the device in its locked position as the result of the magnetic-induced rotation of cap. Magnets are not shown.
Figure 12:
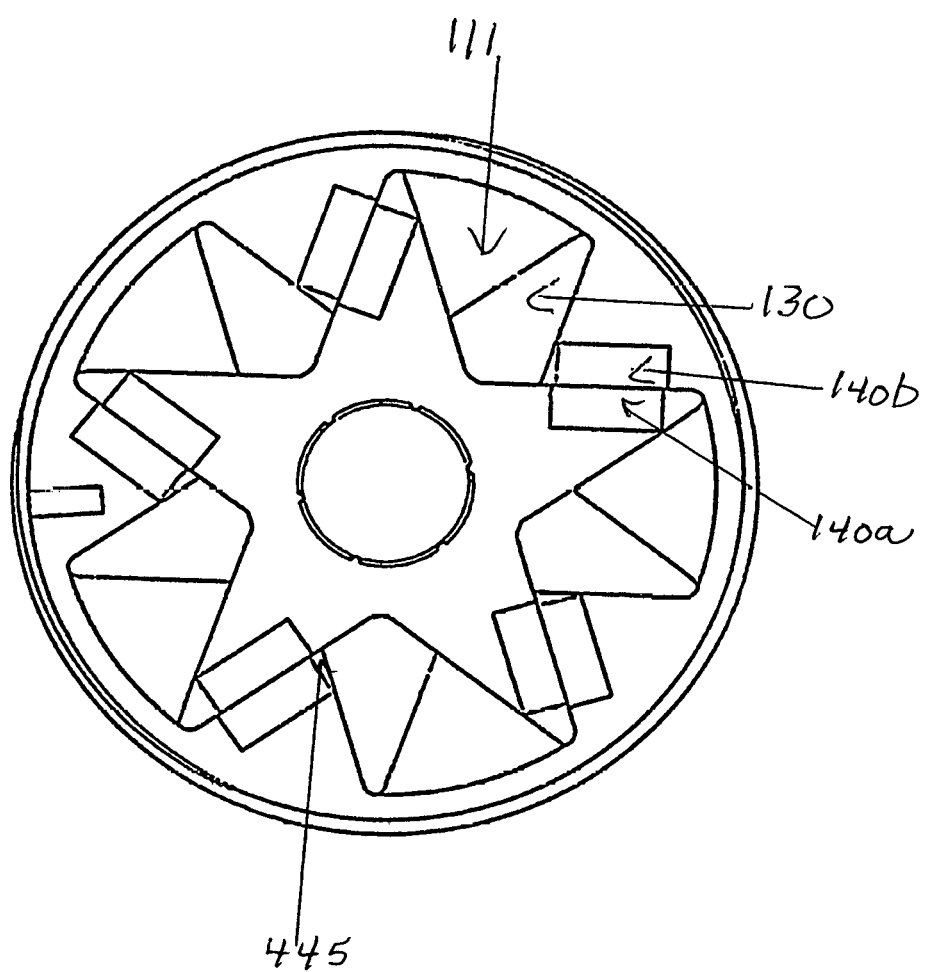
FIG. 12 is a top perspective view of the fully assembled device in its locked position.
Figure 13:
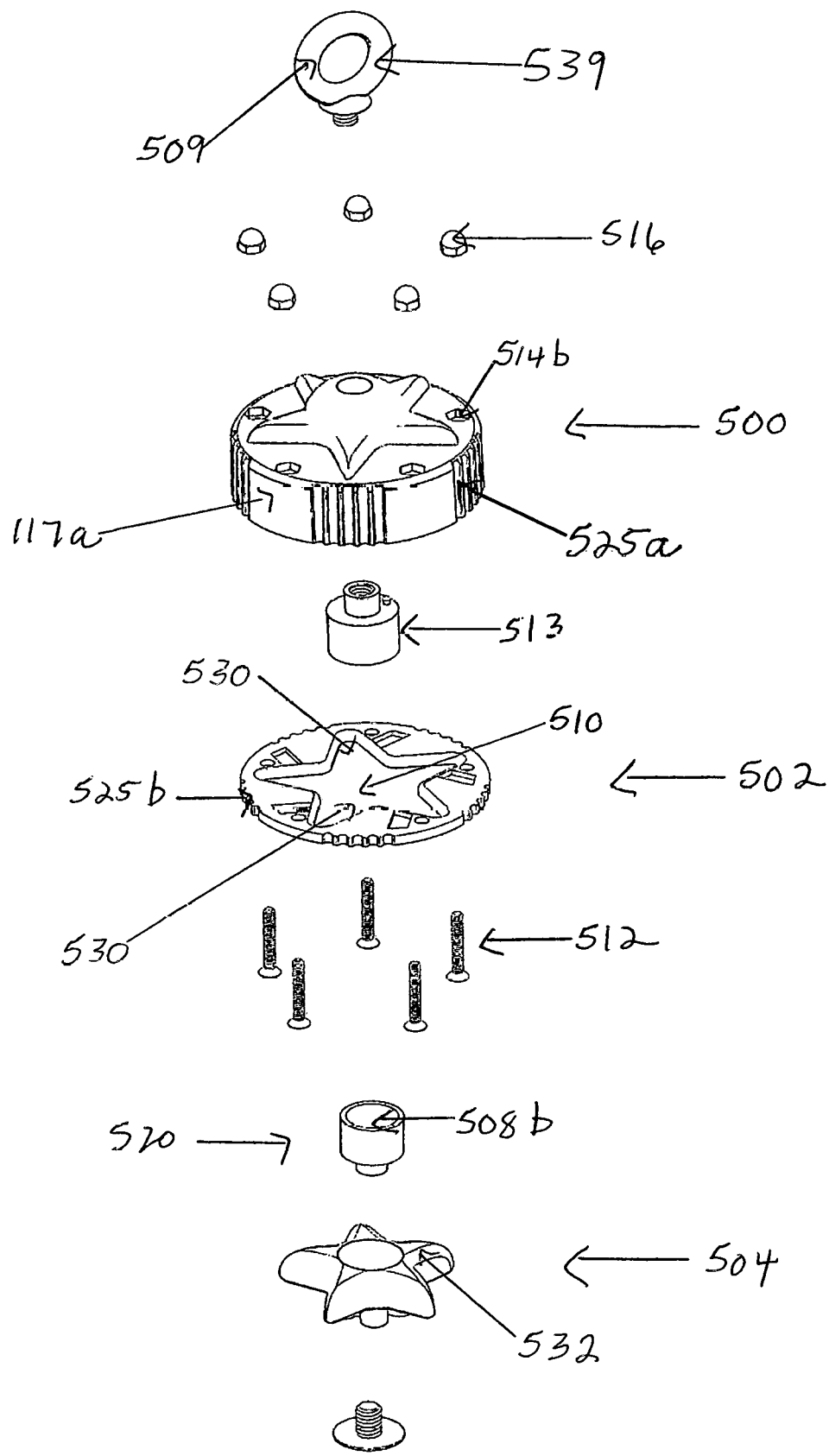
FIG. 13 is a perspective view of another embodiment of the device showing a grooved armature element, a metal disc element comprising a star-shaped aperture and a male insertion element, and the hardware parts are required for securing the covering element to the grooved armature element.
Figure 18A:
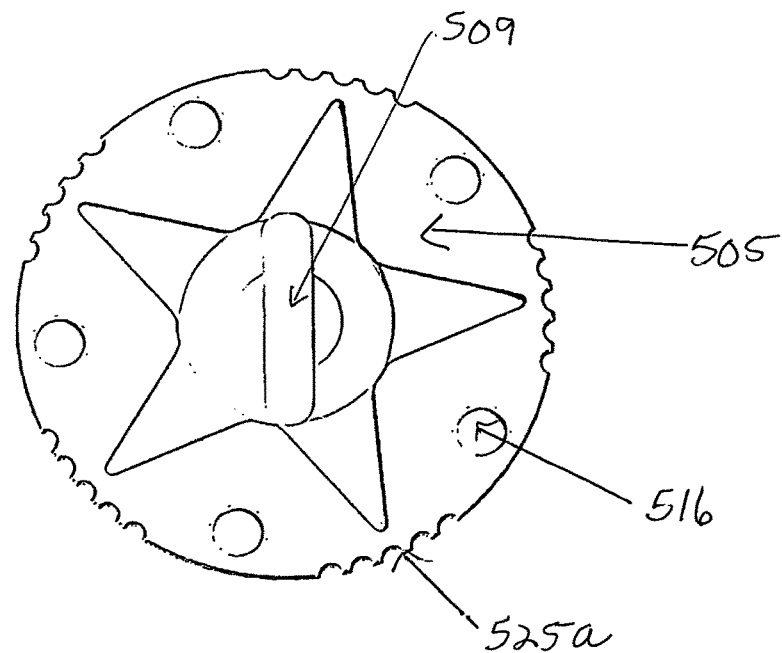
FIG. 18A is a top planar view of the cap of the embodiment shown in FIGS. 17A and B.
Figure 18B:
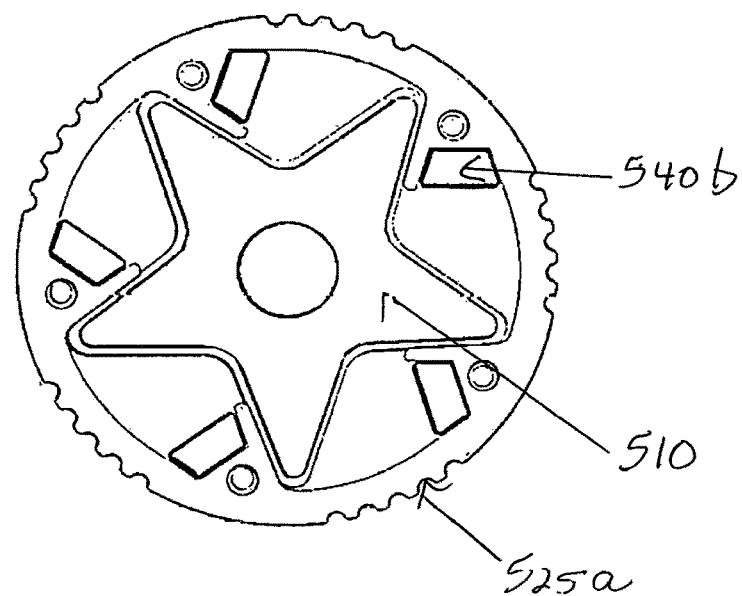
FIG. 18B is a bottom planar view of the same embodiment of the fully assembled device in its unlocked position. The metal plate is not shown.
Figure 18C:
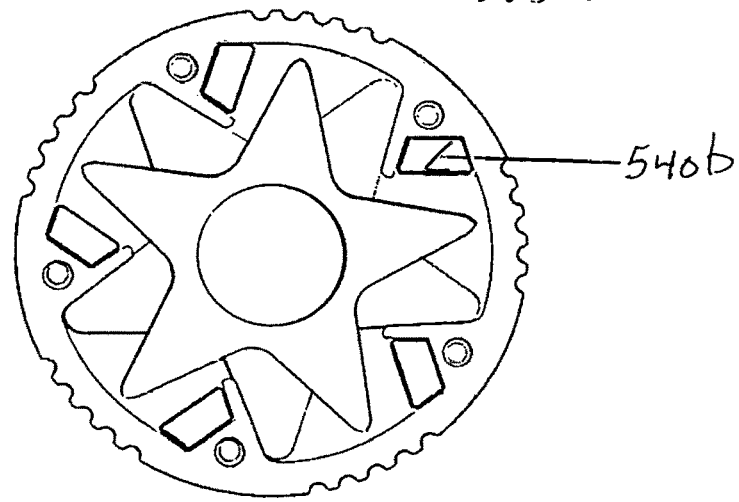
FIG. 18C is a bottom planar view of the same embodiment in its locked position.

Referring again to FIGS. 6, and 7 and now FIG. 8, cap 103 (or 403 or 503) is inserted onto the animal collar-secured male insertion element 104 (or 404) such that triangular projections 132 of the male insertion element 104 (or 404) become aligned within the triangular openings 133 of interior cavity 110b whether comprising one of the disclosed female receptacle elements or comprising the disclosed armature. The attractive magnetic forces between the male insertion element magnets and the holding chamber magnets cause the cap in all disclosed embodiments to rotate with rectangular space 111 to provide device 10's locked position as shown in FIGS. 5D, 12, and 18C.

Figure 14A:
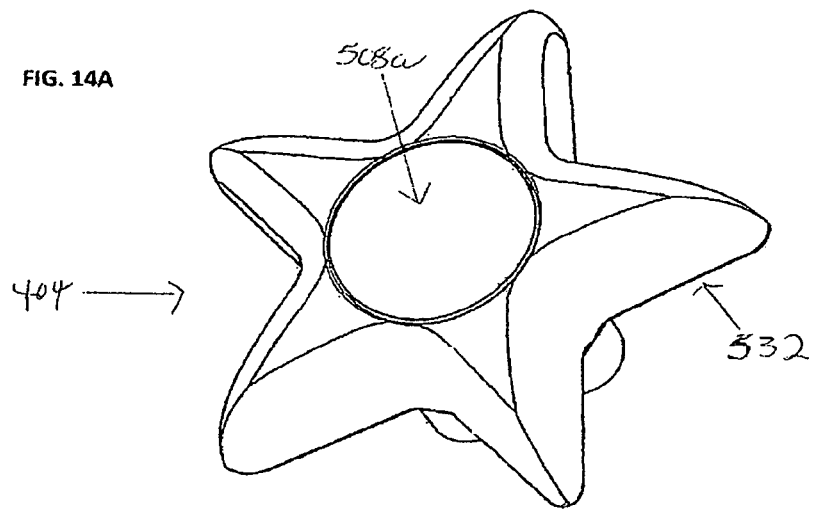
FIG. 14A is a perspective top view of the of the device's male insertion element.
Figure 14B:
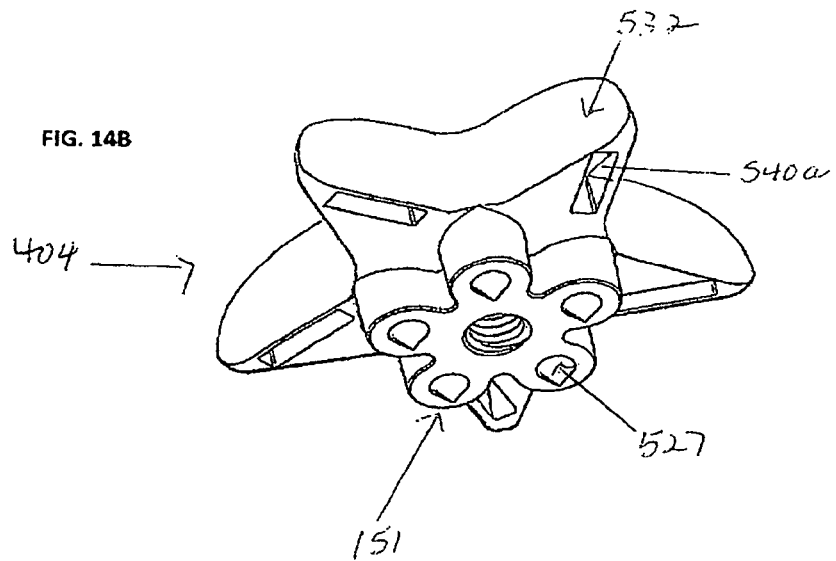
FIG. 14B is perspective bottom view of an embodiment of the device's the male insertion element wherein the element's magnets are disposed on the base of the element's triangular projections instead of on their lateral sides as shown in FIG. 1.

Comparing FIG. 1 and FIG. 14B, centrally-protruding base member 151 of all male insertion element embodiments can have a plurality of shapes. As shown in FIG. 6, the protruding base 151 causes the male insertion element to be positioned above the animal collar to which it is secured. This elevated position helps prevent the animal collar or other support with which device 10 is to be used from interfering with the proper insertion/removal of cap 103, 403, or 503 onto/from the corresponding male insertion element. Additionally, the bottom side of the base included in any of the disclosed male insertion element embodiments may include small projections 527 for gripping the collar to help maintain the vertical positioning of the male insertion element whether or not device 10 is in active use—defined as placing the device 10's cap onto the male insertion element for the purpose of attaching a leash to a collar.

Although the device and various embodiments have been described for usage in reversibly connecting an animal collar to a leash, the invention can used to connect any a wide variety of items as long as the male insertion element can be secured to an object e.g., the strap of a backpack or purse.

The invention has been described wherein an outer star-shaped-aperture comprises all disclosed embodiments provided, whether as part the invention's female receptacle elements or the armature element. The invention may also be practiced with any outer aperture shape and complimentary male insertion element shape that have one or more pairs of sides projecting outwardly from the center of the selected shape including but not limited to a four-point star shaped polygon or a geometric cross. In these cases, the holding chamber's shape would of course need to be modified to provide the required magnetic-induced rotational mechanism governing the interaction between the invention's cap and male insertion element.

All disclosed embodiments operate by the same principle wherein the cap automatically rotates to its locked position as shown in FIGS. 5D, 12, and 18C upon placement of the cap onto the male insertion element housed within the invention's holding chamber and whether that holding chamber comprises the female receptacle element or just the armature itself.

The complimentary shapes and selected sizes of the disclosed magnets provide for locking of the device as well as keeping the cap of the device fully engaged with the male insertion element until the attractive forces between magnets 140a/140b and 108a/108b are sufficiently overcome to provide for separation of the cap 103 (or 403 or 503) from the male insertion element 104 (or 404).

Referring again to FIGS. 2B and 7, another feature of the device 10 includes its decorative potential. In the described embodiments, the top surface of the armature element includes a decorative structure in the shape of a star to provide the device with an attractive surface. The decorative structure 136's design may but need not match the shape of the device's outer aperture 110b. A closed loop 109 is attached to decorative surface 136 present as shown in FIG. 7. The closed loop may be provided as part of the nut or bolt used to secure magnetic screw 435 to the armature element. The device also may be provided in different colors and include, for example, logos and artistic designs.

Furthermore, the device 10 is intended to provide sufficient magnetic attractive force through a combination of magnet number and magnet strength to keep the outer-aperture containing elements 102 (or 402 or 502) and the male insertion elements (104 or 404) in place during usage. By modifying the strength and/or total number of the magnets, the invention may be used for a wide variety of applications. The invention is also designed to provide for one-handed operation. Placement of the cap 103 (or 403 or 503) onto the male insertion element 104 (or 404) causes the device to assume its locked position without further action by the user. Simple manual rotation of the cap accompanied by a lifting motion causes separation of the cap from the male insertion element. No separate buttons or other hardware are required for operation of the device.

The various components comprising the invention may be comprised of plastic, a plastic composite, metal, alloy or any combination thereof. The required magnets for practicing the invention comprise permanent magnets such as neodymium iron boron (NdFeB), samarium cobalt (SmCo), alnico, and ceramic or ferrite magnets.

Directional terms such as "front", "back", "in", "out", "downward", "upper", "lower", "distal", "proximate", "underside", "top", "bottom", "inner", "outer", and the like may have been used in the description. These terms are applicable to the embodiments shown and described in conjunction with the drawings. The terms are merely used for the purpose of description in connection with the drawings and do not necessarily apply to the position in which the label may applied by the method described herein.

While the invention has been described with reference to preferred embodiments, it will be understood by those skilled in the art that various changes may be made and equivalents may be substituted for elements thereof without departing from the scope of the invention. In addition, many modifications could be made to adapt a particular situation or material to the teachings of the invention without departing from the essential scope of the invention thereof. Although two embodiments have been described, it should be emphasized that features of one of the described embodiments may be combined with the features of the other described embodiment.

It is therefore intended that the invention not be limited to the particular embodiments disclosed herein as the best contemplated for carrying out this magnetic connector invention but that the invention will include all embodiments falling within the scope of the appended claims.

What is claimed is:

1. A magnetic connector for selectively and reversibly joining a leash to an animal collar comprising a male insertion element and a cap, said cap comprising a substantially cylindrical armature element and a reversibly connected substantially cylindrical female receptacle element, said cylindrical armature element comprising a circular top with an outer side and an inner side, a curved wall having an outer surface and a threaded inner surface, an armature magnet affixed to substantially the center of said inner side of said circular top, a bottom circular opening, an interior space extending substantially from said inner side of said circular top to said bottom circular opening and a leash hooking loop affixed to said outer side of said circular top;

said cylindrical female receptacle element comprising a diameter slightly less than the diameter of said interior space of said cylindrical armature element, a curved wall with an outer threaded surface for communication with said threaded inner surface of said cylindrical armature element to provide said cap, a circular top-opening, a circular bottom side comprising one substantially centrally positioned outer aperture in the shape of a regular polygon star with five star points for receiving said male insertion element, and an interior hollow cavity comprising five, substantially rectangular housing chambers equally spaced around the center of said interior cavity all said rectangular housing chambers having a back wall, one magnet-containing lateral wall comprising an affixed magnet, an opposite non-lateral wall, and a floor comprising a resting platform adjacent to a substantially triangular opening, with each of the said five triangular openings being aligned with one of the said star points of said outer aperture of said female receptacle element; and said male insertion element comprising a substantially solid star polygon comprising a top side having an affixed magnet of opposite polarity to said armature magnet, said affixed magnet being affixed substantially to the center of said top side, five triangular projections capable of readily being inserted through said outer aperture of said female receptacle and into said triangular openings of said rectangular housing chambers, all five substantially triangular projections substantially equally spaced around the center of said male insertion element wherein all said triangular projections have a point, a magnet-bearing lateral side comprising an affixed magnet, a non-magnet bearing lateral side, and a bottom side with a base member protruding from substantially the center of said bottom side, said base member including an internal threaded socket for adjoining said male insertion element to an animal collar.

2. The magnetic connector as recited in claim 1, wherein said affixed magnets of said magnet-bearing lateral walls of said female receptacle element comprise polarities opposite to the polarities of said affixed magnets of said magnet-bearing lateral sides of said triangular projections of said male insertion element.

3. The magnetic connector as recited in claim 1, wherein said protruding base member of said male insertion element further comprises affixed projections for gripping said animal collar.

4. The magnetic connector as recited in claim 1, wherein said outer surface of said top side of said armature element comprises a decorative design.

5. The magnetic connector as recited in claim 1, wherein said outer surface of said outer wall of said armature element includes a plurality of cap-gripping grooves.

6. A magnetic connector for selectively and reversibly joining a leash to an animal collar comprising a male insertion element and a cap, said cap comprising a substantially cylindrical armature element and a reversibly connected substantially cylindrical female receptacle element, said cylindrical armature element comprising a circular top with an outer side and an inner side, a curved wall having an outer surface and a threaded inner surface, an armature magnet affixed to substantially the center of said inner side of said circular top, a bottom circular opening, an interior space extending substantially from said inner side of said circular top to said bottom circular opening and a leash hooking loop affixed to said outer side of said circular top;

said cylindrical female receptacle element comprising a diameter slightly less than the diameter of said interior space of said cylindrical armature element, a curved wall with an outer threaded surface for communication with said threaded inner surface of said cylindrical armature element to provide said cap, a circular top opening, a circular bottom side comprising one substantially centrally positioned outer aperture in the shape of a regular polygon star with five star points for receiving said male insertion element, and an interior hollow cavity comprising five, substantially rectangular housing chambers equally spaced around the center of said interior cavity all said rectangular housing chambers having a back wall, one magnet-containing lateral wall comprising an affixed magnet, an opposite non-lateral wall, and a floor comprising a resting platform adjacent to a substantially triangular opening, with each of the said five triangular openings being aligned with one of the said star points of said outer aperture of said female receptacle element; and said male insertion element comprising a substantially solid star polygon comprising a top side having an affixed magnet of opposite polarity to said armature magnet, said affixed magnet being affixed substantially to the center of said top side, five triangular projections capable of readily being inserted through said outer aperture of said female receptacle element and into said triangular openings of said rectangular housing chambers, all said five substantially triangular projections substantially equally spaced around the center of said male insertion element wherein all said triangular projections have a point, two lateral walls, a magnet-bearing bottom side each bottom side comprising an affixed magnet, and a base member including an internal threaded socket for adjoining said male insertion element to an animal collar.

7. The magnetic connector as recited in claim 6 wherein said affixed magnets of said magnet-bearing lateral walls of said female receptacle element comprise polarities opposite to the polarities of said affixed magnets of said magnet-bearing bottom sides of said male insertion element's said triangular projections.

8. The magnetic connector as recited in claim 6, wherein said protruding base member of said male insertion element further comprises affixed projections for gripping said animal collar.

9. The magnetic connector as recited in claim 6, wherein said outer surface of said top side of said armature element comprises a decorative design.

10. The magnetic connector as recited in claim 6, wherein said outer surface of said outer wall of said armature element includes a plurality of cap-gripping grooves.

11. A method of using the magnetic connector of claim 1 or 6 to secure a leash to an animal collar comprising the steps of:
   a. Preparing an animal collar to reversibly connect to the magnetic connector's cap by securing the base member protruding from the bottom side of the male insertion element to an animal collar;
   b. Assembling the magnetic connector's cap by screwing the armature element onto the female receptacle element wherein the bottom side of the cap comprises the receptacle element's star-shaped aperture;
   c. Securing an animal leash onto the cap by hooking the animal leash onto the cap's leash hooking loop;
   d. Aligning the cap's star-shaped aperture with the triangular projections of the animal collar's male insertion element;
   e. Placing the cap onto the male insertion element to achieve the cap's locked locked position through the magnetically-induced automatic rotation of the cap relative to the male insertion element as a result of the attractive magnetic forces between the magnets affixed to the male insertion element's triangular projections and the magnet-bearing lateral walls of the holding chambers of the female receptacle element;
   f. Preparing the cap for removal from the animal collar by manually rotating the cap to cause the mechanically-induced separation of the magnets affixed to the magnet-bearing lateral walls of the holding chambers from the magnets affixed to the male insertion element's triangular projections so as to cause the star-shaped aperture of the cap to become aligned with the male insertion element's triangular projections;
   g. Lifting the cap off of the male insertion element;
   h. Optionally unhooking the animal leash from the cap's leash hooking loop; and
   i. Repeating steps c through h with the previously assembled cap and an animal collar comprising a previously secured male insertion element.

\* \* \* \* \*